US011895197B2

(12) United States Patent
Zhu et al.

(10) Patent No.: US 11,895,197 B2
(45) Date of Patent: Feb. 6, 2024

(54) COMMUNICATION METHOD AND APPARATUS

(71) Applicant: HUAWEI TECHNOLOGIES CO., LTD., Guangdong (CN)

(72) Inventors: Qianghua Zhu, Beijing (CN); Hancheng Li, Shanghai (CN); Zaifeng Zong, Nanjing (CN); Fenqin Zhu, Shanghai (CN); Wenfu Wu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/132,243

(22) Filed: Dec. 23, 2020

(65) Prior Publication Data

US 2021/0112127 A1   Apr. 15, 2021

Related U.S. Application Data

(63) Continuation of application No. PCT/CN2019/093188, filed on Jun. 27, 2019.

(30) Foreign Application Priority Data

Jun. 27, 2018   (CN) .................. 201810678465.0

(51) Int. Cl.
*G06F 15/16* (2006.01)
*H04L 67/146* (2022.01)
*H04W 76/12* (2018.01)

(52) U.S. Cl.
CPC .......... *H04L 67/146* (2013.01); *H04W 76/12* (2018.02)

(58) Field of Classification Search
CPC ............ H04L 67/146; H04L 61/5038; H04L 2101/622; H04L 12/4645; H04L 12/4633;
(Continued)

(56) References Cited

U.S. PATENT DOCUMENTS 9,088,619 B2    7/2015 Voit et al.
10,523,466 B1 * 12/2019 Sivaraj .............. H04L 12/4679
(Continued)

FOREIGN PATENT DOCUMENTS

CN    102457444 A    5/2012
CN    102742222 A    10/2012
(Continued)

OTHER PUBLICATIONS

3GPP TR 22.821 V16.1.0 (Jun. 2018), "3rd Generation Partnership Project;Technical Specification Group Services and System Aspects;Feasibility Study on LAN Support in 5G(Release 16)," Jun. 2018, 52 pages.
3GPP TS 22.261 V16.4.0 (Jun. 2018), "3rd Generation Partnership Project;Technical Specification Group Services and System Aspects;Service requirements for the 5G system;Stage 1(Release 16)," Jun. 2018, 55 pages.
(Continued)

*Primary Examiner* — Oleg Survillo
(74) *Attorney, Agent, or Firm* — Fish & Richardson P.C.

(57) ABSTRACT

Example communication methods and apparatus are described. One example method includes determining a first encapsulation identifier corresponding to an Ethernet session by a control plane network element and sending the first encapsulation identifier corresponding to the Ethernet session to a user plane network element, where the first encapsulation identifier is used to instruct the user plane network element to process a data packet corresponding to the Ethernet session based on the first encapsulation identifier. The terminal device determines the first encapsulation identifier corresponding to the Ethernet session and encapsulates an uplink data packet based on the first encapsulation identifier, where the uplink data packet is a data packet triggered by an application program bound to the Ethernet session. The encapsulated data packet is mapped to the Ethernet session corresponding to the first encapsulation identifier for transmission based on the first encapsulation identifier.

12 Claims, 9 Drawing Sheets

(58) Field of Classification Search
CPC ....... H04L 69/22; H04L 69/321; H04L 67/14; H04L 2212/00; H04L 67/51; H04W 76/12; H04W 4/08
See application file for complete search history.

(56) References Cited

U.S. PATENT DOCUMENTS

| | | | | |
|---|---|---|---|---|
| 2004/0184408 | A1* | 9/2004 | Liu | H04L 12/4633 370/236 |
| 2014/0101305 | A1 | 4/2014 | Kelley, Jr. | |
| 2014/0177632 | A1* | 6/2014 | Liu | H04N 21/6405 370/390 |
| 2014/0185603 | A1* | 7/2014 | Kaippallimalil | H04W 76/15 370/338 |
| 2017/0303189 | A1* | 10/2017 | Hampel | H04W 76/19 |
| 2017/0359749 | A1 | 12/2017 | Dao | |
| 2018/0103495 | A1* | 4/2018 | Kim | H04W 76/12 |
| 2019/0306752 | A1* | 10/2019 | Lai | H04W 88/06 |
| 2019/0394279 | A1* | 12/2019 | Dao | H04W 48/04 |
| 2020/0092212 | A1* | 3/2020 | Yu | H04W 28/24 |
| 2020/0259786 | A1* | 8/2020 | Saarinen | H04W 12/009 |
| 2020/0344153 | A1* | 10/2020 | Wu | H04L 43/028 |
| 2021/0152615 | A1* | 5/2021 | Karampatsis | H04W 40/22 |

FOREIGN PATENT DOCUMENTS

| | | | |
|---|---|---|---|
| CN | 105493533 | A | 4/2016 |
| CN | 106900081 | A | 6/2017 |
| CN | 106993067 | A | 7/2017 |
| CN | 106993067 | B | 7/2017 |
| CN | 107566115 | A | 1/2018 |
| CN | 108011899 | A | 5/2018 |
| WO | 2018070436 | A1 | 4/2018 |

OTHER PUBLICATIONS

Extended European Search Report issued in European Application No. 19824663.9 dated Jun. 30, 2021, 11 pages.
Huawei, HiSilicon, "Support for 5GLAN communication service key issue," 3GPP TSG-SA WG2 Meeting #128, S2-186946, Vilnius, Lithuania, Jun. 2-6, 2018, 5 pages.
Huawei, HiSilicon, "23.503: Clarification on URSP," 3GPP TSG SA WG2 #124, S2-178890, Reno, USA, Nov. 27-Dec. 1, 2017, 11 pages.
Office Action issued in Japanese Application No. 2020-572779 dated Mar. 14, 2022, 11 pages (with English translation).
3GPP TS 23.501 V1.3.0 (Sep. 2017), "3rd Generation Partnership Project;Technical Specification Group Services and System Aspects-;System Architecture for the 5G System; Stage 2 (Release 15)," Sep. 2017, 206 pages.
Office Action issued in Chinese Application No. 201810678465.0 dated Feb. 3, 2021, 5 pages.
PCT International Search Report and Written Opinion issued in International Application No. PCT/CN2019/093188 dated Sep. 11, 2019, 17 pages (with English translation).
3GPP TS 23. 501 V15.2.0 (Jun. 2018), "3rd Generation Partnership Project; Technical Specification Group Services and System Aspects; System Architecture for the 5G System; Stage 2 (Release 15)," Jun. 2018, 25 pages.
3GPP TS 23. 502 V15.2.0 (Jun. 2018), "3rd Generation Partnership Project; Technical Specification Group Services and System Aspects; Procedures for the 5G System; Stage 2 (Release 15)," Jun. 2018, 28 pages.
Office Action issued in Japanese Application No. 2020-572779 dated Oct. 17, 2022, 17 pages (with English translation).

* cited by examiner

COMMUNICATION METHOD AND APPARATUS

CROSS-REFERENCE TO RELATED APPLICATIONS

This application is a continuation of International Application No. PCT/CN2019/093188, filed on Jun. 27, 2019, which claims priority to Chinese Patent Application No. 201810678465.0, filed on Jun. 27, 2018. The disclosures of the aforementioned applications are hereby incorporated by reference in their entireties.

TECHNICAL FIELD

Embodiments of this application relate to the field of communications technologies, and specifically, to a communication method and an apparatus.

BACKGROUND

A fifth generation mobile communications (5G) system can support three session types, an internet protocol (IP) session, an Ethernet session, and an unstructured session. An Ethernet session establishment process is a process in which a terminal device (for example, a user terminal (UE)) requests a network to allocate a resource for an Ethernet session of the UE, to be specific, a process from sending a session establishment request message by the UE to receiving, by the UE, a session establishment response message sent by the network. An Ethernet session modification process is a process in which the UE requests the network to modify a resource for an Ethernet session of the UE, to be specific, a process from sending a session modification request message by the UE to receiving, by the UE, a session modification response message sent by the network.

The Ethernet session establishment process may include the following process: 1. The UE requests the network to establish the Ethernet session, and the UE sends an Ethernet session establishment request to a session management function (SMF) by using an access and mobility management function (AMF). 2. The SMF obtains a media access control (MAC) address available to the Ethernet session from data network-authentication, authorization, and accounting (DN-AAA). 3. The SMF provides a quality of service (QoS) rule (rule) for the UE based on a MAC address and an Ethernet frame structure of the UE, and provides a forwarding rule for a user plane function (UPF). 4. The SMF sets a filtering rule for the UPF based on the MAC address available to the Ethernet session. 5. When the UPF receives the MAC address sent by the UE, the UPF associates the MAC address of the UE with the Ethernet session, and stores an association between the MAC address of the UE and the Ethernet session in the UPF.

In the foregoing process, if the UE uses only one MAC address, but the UE can support a plurality of Ethernet sessions at the same time, for example, different Ethernet sessions may belong to different network slices, different data networks, different access types, or different 5G local area networks (LAN), when the plurality of Ethernet sessions supported by the UE at the same time share the MAC address of the UE, because data of the UE needs to be bound to an existing Ethernet session based on the MAC address of the UE for transmission, the Ethernet sessions cannot be distinguished. Therefore, a wrong Ethernet session may be selected during data transmission.

SUMMARY

In view of the technical problems to be resolved, embodiments of this application provide a communication method and an apparatus, to resolve a prior-art problem that a plurality of Ethernet sessions cannot be distinguished, so that it can be ensured that data is transmitted by using a correct Ethernet session.

A first aspect of the embodiments of this application provides a communication method, including:
 determining, by a control plane network element, a first encapsulation identifier corresponding to an Ethernet session; and
 sending, by the control plane network element, the first encapsulation identifier corresponding to the Ethernet session to a user plane network element, where the first encapsulation identifier is used to instruct the user plane network element to process a data packet corresponding to the Ethernet session based on the first encapsulation identifier.

In the first aspect of the embodiments of this application, when the control plane network element determines the first encapsulation identifier corresponding to the Ethernet session (how to determine the first encapsulation identifier will be described in the following content), the control plane network element sends the first encapsulation identifier corresponding to the Ethernet session to the user plane network element, so that the user plane network element can learn of the first encapsulation identifier corresponding to the Ethernet session. In this way, when receiving the data packet corresponding to the Ethernet session, the user plane network element may process the data packet based on the first encapsulation identifier. For example, for an uplink data packet, the user plane network element may delete the first encapsulation identifier carried in the uplink data packet corresponding to the Ethernet session, and add a corresponding data network local area network identifier. For a downlink data packet, the user plane network element may delete a data network local area network identifier carried in the downlink data packet corresponding to the Ethernet session, and add the first encapsulation identifier. In this way, data packets corresponding to different Ethernet sessions may be transmitted by using correct Ethernet sessions. An Ethernet session is bound to an encapsulation identifier, and different Ethernet sessions are bound to different encapsulation identifiers. The different Ethernet sessions may be distinguished by using the different bound encapsulation identifiers, so that it can be ensured that data is transmitted by using a correct Ethernet session.

The encapsulation identifiers are used to identify different Ethernet sessions, and may be virtual local area network identifiers (VLAN ID), 5G local area network identifiers (5G LAN ID), or other identifiers.

The data packet corresponding to the Ethernet session is a data packet transmitted by using the Ethernet session. For example, the Ethernet session is bound to an application program, and the data packet corresponding to the Ethernet session is a data packet triggered by the application program.

In a possible implementation, in a process of establishing or modifying the Ethernet session, the control plane network element determines the first encapsulation identifier corresponding to the Ethernet session, to distinguish Ethernet sessions on a terminal device. In other words, when receiving a session management request message from the terminal device, the control plane network element determines the first encapsulation identifier corresponding to the Ethernet session. The session management request message is used to request to establish or modify the Ethernet session.

The control plane network element may determine the first encapsulation identifier corresponding to the Ethernet session in the following manners.

Manner 1: The session management request message includes a second encapsulation identifier, and the second encapsulation identifier is an encapsulation identifier allocated by the terminal device to the Ethernet session. The control plane network element determines the second encapsulation identifier carried in the session management request message as the first encapsulation identifier corresponding to the Ethernet session. When requesting to establish or modify an Ethernet session, the terminal device notifies, by using the session management request message, the control plane network element of an encapsulation identifier allocated to the Ethernet session, and the control plane network element may use the encapsulation identifier allocated by the terminal device as an encapsulation identifier corresponding to the Ethernet session.

The second encapsulation identifier is not limited to being carried in the session management request message sent by the terminal device to the control plane network element.

When determining the second encapsulation identifier reported by the terminal device, as the first encapsulation identifier corresponding to the Ethernet session, the control plane network element may send a session management response message to the terminal device. When receiving the session management response message, the terminal device may learn that the control plane network element determines the second encapsulation identifier as the first encapsulation identifier corresponding to the Ethernet session, so that when sending the uplink data packet corresponding to the Ethernet session, the terminal device processes the uplink data packet based on the second encapsulation identifier. For example, the terminal device adds the second encapsulation identifier to the uplink data packet, and transmits, by using the Ethernet session, the uplink data packet to which the second encapsulation identifier is added.

Manner 2: The session management request message includes a second encapsulation identifier, and the second encapsulation identifier is an encapsulation identifier allocated by the terminal device to the Ethernet session. The control plane network element determines whether the second encapsulation identifier is available, to be specific, determines whether the second encapsulation identifier is bound to another Ethernet session of the terminal device, or whether a value of the second encapsulation identifier is within a valid range, for example, 1-4094, or whether the second encapsulation identifier has a special function, or whether the second encapsulation identifier is bound to a 5G LAN in which the Ethernet session is located.

If the second encapsulation identifier is not bound to another Ethernet session of the terminal device, the value of the second encapsulation identifier is within the valid range, the second encapsulation identifier does not have a special function, and the second encapsulation identifier is bound to the 5G LAN in which the Ethernet session is located, the control plane network element may determine that the second encapsulation identifier is available, and determine the second encapsulation identifier as the first encapsulation identifier bound to the Ethernet session, in other words, the first encapsulation identifier corresponding to the Ethernet session. When receiving the second encapsulation identifier, the control plane network element determines whether the second encapsulation identifier is available, so that a case in which two Ethernet sessions of the terminal device are bound to a same encapsulation identifier can be avoided.

When determining the second encapsulation identifier reported by the terminal device, as the first encapsulation identifier corresponding to the Ethernet session, the control plane network element may send a session management response message to the terminal device. When receiving the session management response message, the terminal device may learn that the control plane network element determines the second encapsulation identifier as the first encapsulation identifier corresponding to the Ethernet session, so that when sending the uplink data packet corresponding to the Ethernet session, the terminal device processes the uplink data packet based on the second encapsulation identifier. For example, the terminal device adds the second encapsulation identifier to the uplink data packet, and transmits, by using the Ethernet session, the uplink data packet to which the second encapsulation identifier is added.

If the second encapsulation identifier is bound to another Ethernet session of the terminal device, or the value of the second encapsulation identifier is not within the valid range, or the second encapsulation identifier has a special function, or the second encapsulation identifier is not bound to the 5G LAN in which the Ethernet session is located, the control plane network element may send a message to the terminal device, where the message may instruct the terminal device to redetermine and report a second encapsulation identifier, or the control plane network element rejects establishment or modification of the Ethernet session and indicates a rejection cause, and the terminal device may redetermine a second encapsulation identifier based on the rejection cause and resend a session management request message to the control plane network element to re-request to establish or modify the Ethernet session; or the control plane network element autonomously determines an encapsulation identifier for the Ethernet session, and uses the encapsulation identifier as the first encapsulation identifier corresponding to the Ethernet session.

When autonomously determining the encapsulation identifier for the Ethernet session, the control plane network element may send a session management response message to the terminal device, where the session management response message may indicate the first encapsulation identifier determined by the control plane network element for the Ethernet session. When receiving the session management response message, the terminal device may learn of the first encapsulation identifier determined by the control plane network element for the Ethernet session, so that when sending the uplink data packet corresponding to the Ethernet session, the terminal device processes the uplink data packet based on the first encapsulation identifier. For example, the terminal device adds the first encapsulation identifier to the uplink data packet, and transmits, by using the Ethernet session, the uplink data packet to which the first encapsulation identifier is added.

Manner 3: The control plane network element allocates an encapsulation identifier to the Ethernet session, and determines the allocated encapsulation identifier as the first encapsulation identifier corresponding to the Ethernet session. The control plane network element directly determines the encapsulation identifier bound to the Ethernet session, so that it can be ensured that the allocated encapsulation identifier is valid, and further, a case in which two Ethernet sessions of the terminal device are bound to a same encapsulation identifier can be avoided.

When allocating the encapsulation identifier, the control plane network element sends the first encapsulation identifier corresponding to the Ethernet session to the terminal device, that is, notifies the terminal device, so that the terminal device can learn of the first encapsulation identifier bound to the Ethernet session. When sending the uplink data packet corresponding to the Ethernet session, the terminal device may process the uplink data packet based on the first encapsulation identifier. For example, the terminal device adds the first encapsulation identifier to the uplink data packet, and transmits, by using the Ethernet session, the uplink data packet to which the first encapsulation identifier is added.

The control plane network element may send the first encapsulation identifier corresponding to the Ethernet session to the terminal device by using a session management response message, in other words, add the first encapsulation identifier corresponding to the Ethernet session to the session management response message, so that the terminal device can learn of the first encapsulation identifier bound to the Ethernet session.

Manner 4: The control plane network element receives a first message from an access management network element, where the first message includes a third encapsulation identifier; and determines the third encapsulation identifier as the first encapsulation identifier corresponding to the Ethernet session, where the third encapsulation identifier is an encapsulation identifier allocated by the access management network element to the Ethernet session, and may be an encapsulation identifier autonomously allocated by the access management network element to the Ethernet session, or an encapsulation identifier received by the access management network element from a policy management network element, or an encapsulation identifier received by the access management network element from the terminal device. The access management network element determines the encapsulation identifier bound to the Ethernet session, and notifies the control plane network element of the encapsulation identifier, and the control plane network element sends the encapsulation identifier to the user plane network element, so that processing load of the control plane network element can be reduced to some extent.

Manner 5: The control plane network element receives a second message from a policy management network element, where the second message includes a fourth encapsulation identifier; and determines the fourth encapsulation identifier as the first encapsulation identifier of the Ethernet session, where the fourth encapsulation identifier is an encapsulation identifier allocated by the policy management network element to the Ethernet session, and may be an encapsulation identifier autonomously allocated by the policy management network element to the Ethernet session, or an encapsulation identifier determined by the policy management network element based on configuration information and a 5G LAN in which the Ethernet session is located. The policy management network element determines the encapsulation identifier bound to the Ethernet session, and notifies the control plane network element of the encapsulation identifier, and the control plane network element sends the encapsulation identifier to the user plane network element, so that processing load of the control plane network element can be reduced to some extent.

Manner 6: The control plane network element receives a 5G local area network identifier from the terminal device, where the 5G local area network identifier is an identifier of a 5G local area network to which the Ethernet session belongs. The control plane network element may determine the first encapsulation identifier corresponding to the Ethernet session based on the 5G local area network identifier.

In this case, the control plane network element may determine the 5G local area network identifier as the first encapsulation identifier corresponding to the Ethernet session. For example, a first Ethernet session of a first terminal device and a second Ethernet session of a second terminal device belong to a same 5G LAN group and have a same 5G LAN ID. The control plane network element determines that an encapsulation identifier corresponding to the first Ethernet session established by the first terminal device is 1, and the second terminal device determines that an encapsulation identifier corresponding to the second Ethernet session established by the second terminal device is 2, and reports the encapsulation identifier 2 to the control plane network element. The first Ethernet session of the first terminal device and the second Ethernet session of the second terminal device belong to the same 5G LAN group, but the encapsulation identifiers bound to the first Ethernet session and the second Ethernet session are different. In this case, the control plane network element may modify the encapsulation identifier 1 and/or the encapsulation identifier 2, so that when different Ethernet sessions established by different terminal devices belong to the same 5G LAN group, the different Ethernet sessions may be bound to a same encapsulation identifier. Therefore, when forwarding a data packet, the user plane network element may forward the data packet between the Ethernet sessions having the same encapsulation identifier, thereby implementing 5G LAN communication. It may be understood that the 5G LAN ID is used by the control plane network element to assist in determining the encapsulation identifier corresponding to the Ethernet session.

The 5G local area network identifier may be carried in the session management request message, or may not be carried in the session management request message.

The access management network element may also determine the encapsulation identifier corresponding to the Ethernet session according to Manner 1, Manner 2, Manner 3, Manner 5, and Manner 6 in which the control plane network element determines the encapsulation identifier corresponding to the Ethernet session, and sends the encapsulation identifier corresponding to the Ethernet session to the control plane network element.

In a possible implementation, the control plane network element may further receive an application program identifier from the terminal device or linked-device information from the terminal device, where the application program identifier is an identifier of an application program triggering the terminal device to establish or modify the Ethernet session, and the linked-device information of the terminal device is information about a linked device triggering the terminal device to establish or modify the Ethernet session. The linked-device information indicates device information linked to the terminal device, and may include information such as a device MAC address, a device identifier, and a device IP address linked to the terminal device. The terminal device sends the application program identifier or the linked-device information to the control plane network element, to notify the control plane network element that the Ethernet session is related to the application program identifier or the linked-device information, to be specific, the Ethernet session is used to transmit a data packet triggered by the application program corresponding to the application program identifier, or the Ethernet session is used to transmit a data packet triggered by the device linked to the terminal device. It may be understood that the application program identifier or the linked-device information is bound to the Ethernet session.

The control plane network element may send the application program identifier or the linked-device information to the policy management network element, and the policy management network element updates a user equipment route selection policy (URSP) based on the application program identifier or the linked-device information. To be specific, the policy management network element may add, to the URSP, an encapsulation identifier corresponding to the application program identifier or the linked-device information (the application program identifier or the linked-device information is bound to the Ethernet session, and the Ethernet session is bound to the encapsulation identifier, so that the encapsulation identifier corresponding to the application program identifier or the linked-device information is obtained).

The application program identifier or the linked-device information may be carried in the session management request message of the Ethernet session, or may not be carried in the session management request message of the Ethernet session.

In a possible implementation, the control plane network element may further receive a data network local area network identifier from the terminal device, where the data network local area network identifier is an identifier of a local area network to which the terminal device belongs in a data network.

The data network local area network identifier may be carried in the session management request message, or may not be carried in the session management request message.

In a possible implementation, the control plane network element may send the data network local area network identifier to the user plane network element, so that the user plane network element performs corresponding processing when receiving the data packet corresponding to the Ethernet session. For example, for an uplink data packet, the user plane network element replaces the encapsulation identifier that is encapsulated in the uplink data packet and that corresponds to the Ethernet session with the data network local area network identifier, to transmit the uplink data packet to the corresponding data network local area network; and for downlink data, the user plane network element replaces the data network local area network identifier in the downlink data with the encapsulation identifier corresponding to the Ethernet session, to transmit the downlink data to the corresponding Ethernet session.

In a possible implementation, the control plane network element may send the 5G local area network identifier to the policy management network element, so that the policy management network element updates the URSP of the terminal device.

It should be noted that the access management network element is omitted in the interaction process between the control plane network element and the terminal device. For example, a process in which the terminal device sends the second encapsulation identifier to the control plane network element is: The terminal device first sends the second encapsulation identifier to the access management network element, and then the access management network element forwards the second encapsulation identifier to the control plane network element.

A second aspect of the embodiments of this application provides a control plane network element, where the control plane network element has functions for implementing the method provided in the first aspect. The functions may be implemented by hardware, or may be implemented by hardware executing corresponding software. The hardware or the software includes one or more modules corresponding to the foregoing functions.

In a possible implementation, the control plane network element includes: a processing unit, configured to determine a first encapsulation identifier corresponding to an Ethernet session; and a transceiver unit, configured to send the first encapsulation identifier corresponding to the Ethernet session to a user plane network element, where the first encapsulation identifier is used to instruct the user plane network element to process a data packet corresponding to the Ethernet session based on the first encapsulation identifier.

In a possible implementation, the control plane network element includes: a processor, a transceiver, and a memory. The memory stores a computer program. The computer program includes a program instruction. The processor is configured to invoke program code to perform the following operations: determining a first encapsulation identifier corresponding to an Ethernet session; and controlling the transceiver to send the first encapsulation identifier corresponding to the Ethernet session to a user plane network element, where the first encapsulation identifier is used to instruct the user plane network element to process a data packet corresponding to the Ethernet session based on the first encapsulation identifier.

Based on a same inventive concept, for a problem-resolving principle and beneficial effects of the control plane network element, refer to the method and beneficial effects brought by the method in the first aspect. Therefore, for implementation of the apparatus, refer to the implementation of the method. Repeated parts are not described again.

A third aspect of the embodiments of this application provides a computer-readable storage medium. The computer-readable storage medium stores an instruction, and when the instruction is run on a computer, the computer is enabled to perform the method according to the first aspect.

A fourth aspect of the embodiments of this application provides a computer program product including an instruction. When the computer program product is run on a computer, the computer is enabled to perform the method according to the first aspect.

A fifth aspect of the embodiments of this application provides a communication method. The method is used to transmit an uplink data packet of a terminal device by using an Ethernet session, and includes:

determining, by the terminal device, a first encapsulation identifier corresponding to the Ethernet session;

encapsulating, by the terminal device, the uplink data packet based on the first encapsulation identifier, where the uplink data packet is a data packet triggered by an application program bound to the Ethernet session; and;

mapping, by the terminal device based on the first encapsulation identifier, the encapsulated data packet to the Ethernet session for transmission.

According to the fifth aspect of this application, when determining the first encapsulation identifier corresponding to the Ethernet session, the terminal device encapsulates, based on the first encapsulation identifier, the uplink data packet triggered by the application program bound to the Ethernet session. For example, the terminal device adds the first encapsulation identifier to a data packet header of the uplink data packet. Then, the terminal device maps, based on the first encapsulation identifier, the encapsulated uplink data packet to the Ethernet session for transmission. The first encapsulation identifier is encapsulated in the uplink data packet and a correspondence exists between the first encapsulation identifier and the Ethernet session. Therefore, when the terminal device sends the encapsulated uplink data packet by using the Ethernet session and transmits the encapsulated uplink data packet to a core network, a core network element may learn, based on the first encapsulation identifier, that the uplink data packet is the data packet corresponding to the Ethernet session. In this way, it may be ensured that data is transmitted by using a correct Ethernet session in a transmission process.

For example, the terminal device may determine an encapsulation identifier 1 corresponding to an Ethernet session 1 and an encapsulation identifier 2 corresponding to an Ethernet session 2 (it is assumed that the encapsulation identifier 1 is different from the encapsulation identifier 2), where the Ethernet session 1 is bound to an application program 1, and the Ethernet session 2 is bound to an application program 2. For an uplink data packet 1 triggered by the application program 1, the terminal device encapsulates the uplink data packet 1 based on the encapsulation identifier 1, and then maps the encapsulated uplink data packet to the Ethernet session 1 for transmission. For an uplink data packet 2 triggered by the application program 2, the terminal device encapsulates the uplink data packet 2 based on the encapsulation identifier 2, and then maps the encapsulated uplink data packet to the Ethernet session 2 for transmission. In this way, data packets generated by different application programs on the terminal device may be transmitted by using different Ethernet sessions, thereby ensuring that different data packets are transmitted by using correct Ethernet sessions.

In a possible implementation, if the terminal device can obtain an encapsulation identifier corresponding to the application program from a URSP, the terminal device may obtain a second encapsulation identifier corresponding to the application program from the URSP when determining that the Ethernet session needs to be established or modified. The URSP may include a correspondence between each of one or more application program identifiers and an encapsulation identifier. The terminal device may match an identifier of the application program with the URSP, and if the identifier of the application program exists in the URSP, the terminal device obtains an encapsulation identifier corresponding to the application program identifier, and uses the encapsulation identifier corresponding to the application program identifier as the second encapsulation identifier corresponding to the application program.

It may be understood that the URSP includes a correspondence between an application program identifier and an encapsulation identifier, and an application program is bound to an Ethernet session, so that an encapsulation identifier corresponding to the Ethernet session may be obtained.

When obtaining the second encapsulation identifier corresponding to the application program, the terminal device sends, to a control plane network element, a session management request message carrying the second encapsulation identifier, and receives a session management response message sent by the control plane network element, where the session management response message carries the second encapsulation identifier. When receiving the session management response message, the terminal device determines the second encapsulation identifier as the first encapsulation identifier corresponding to the Ethernet session, so that the terminal device can encapsulate, based on the first encapsulation identifier, the uplink data packet triggered by the application program, for example, add the first encapsulation identifier to the data packet header of the uplink data packet.

In a possible implementation, if the terminal device cannot obtain the encapsulation identifier corresponding to the application program from the URSP, in other words, a correspondence between the identifier of the application program and the encapsulation identifier does not exist in the URSP, when the terminal device determines that the Ethernet session needs to be established or modified, the terminal device may autonomously allocate an encapsulation identifier to the Ethernet session, determine the allocated encapsulation identifier as the second encapsulation identifier corresponding to the Ethernet session, and determine the second encapsulation identifier as the first encapsulation identifier corresponding to the Ethernet session.

When determining the second encapsulation identifier corresponding to the Ethernet session, the terminal device may send, to the control plane network element, a session management request message carrying the second encapsulation identifier, and receive a session management response message sent by the control plane network element, where the session management response message carries the second encapsulation identifier. When receiving the session management response message from the control plane network element, the terminal device determines the second encapsulation identifier as the first encapsulation identifier corresponding to the Ethernet session, so that the terminal device can encapsulate the data packet corresponding to the Ethernet session based on the first encapsulation identifier, for example, add the first encapsulation identifier to the data packet header of the uplink data packet.

In a possible implementation, when determining the second encapsulation identifier or a third encapsulation identifier corresponding to the Ethernet session, the terminal device may send the second encapsulation identifier or the third encapsulation identifier to the control plane network element, and the control plane network element determines whether the second encapsulation identifier is available. This can avoid a case in which two Ethernet sessions of the terminal device are bound to a same encapsulation identifier.

In a possible implementation, when determining the second encapsulation identifier corresponding to the Ethernet session, the terminal device may send the second encapsulation identifier to an access management network element, and the access management network element determines whether the second encapsulation identifier is available. This can avoid a case in which two Ethernet sessions of the terminal device are bound to a same encapsulation identifier.

In a possible implementation, after the terminal device sends the second encapsulation identifier corresponding to the Ethernet session to the control plane network element or the access management network element, if the terminal device receives the session management response message from the control plane network element, the terminal device determines the second encapsulation identifier as the first encapsulation identifier corresponding to the Ethernet session or determines an encapsulation identifier carried in the session management response message as the first encapsulation identifier corresponding to the Ethernet session.

In a possible implementation, the terminal device receives a third encapsulation identifier from a network element on a core network side, and determines the third encapsulation identifier as the first encapsulation identifier corresponding to the Ethernet session. In other words, the terminal device directly determines the encapsulation identifier sent by the network element on the core network side as the first encapsulation identifier corresponding to the Ethernet session.

The network element on the core network side may be the control plane network element. The third encapsulation identifier may be an encapsulation identifier autonomously allocated by the control plane network element, or an encapsulation identifier received by the control plane network element from the access management network element, or an encapsulation identifier received by the control plane network element from a policy management network element. The third encapsulation identifier may be carried in the session management response message sent by the control plane network element to the terminal device, so that the terminal device may learn of a fourth encapsulation identifier bound to the Ethernet session.

The network element on the core network side may be the access management network element. The third encapsulation identifier may be an encapsulation identifier autonomously allocated by the access management network element, or an encapsulation identifier received by the access management network element from a policy management network element.

In a possible implementation, when establishment or modification of the Ethernet session is completed and the application program is ready to send the uplink data packet, the terminal device may obtain the encapsulation identifier corresponding to the application program from the URSP or preset configuration information, encapsulate the uplink data packet based on the encapsulation identifier corresponding to the application program, and then send the encapsulated uplink data packet by using the Ethernet session corresponding to the application program, so that it can be ensured that data is transmitted by using a correct Ethernet session. The URSP or the preset configuration information may include a correspondence between each of one or more application program identifiers and an encapsulation identifier. The terminal device may match an identifier of the application program with the URSP or the preset configuration information, and if the identifier of the application program identifier exists in the URSP or the preset configuration information, the terminal device obtains an encapsulation identifier corresponding to the application program identifier.

In a possible implementation, the uplink data packet may alternatively be a data packet triggered by a linked device bound to the Ethernet session, and the URSP may further include a correspondence between linked-device information and an encapsulation identifier, so that the terminal device may obtain an encapsulation identifier corresponding to the linked device from the URSP In a possible implementation, the uplink data packet may be a data packet triggered by the application program bound to the Ethernet session, or a data packet triggered by an application program that is bound to the Ethernet session and that is on the linked device linked to the terminal device.

In a possible implementation, the terminal device sends the application program identifier or the linked-device information to the control plane network element, where the application program identifier is the identifier of the application program triggering the terminal device to establish or modify the Ethernet session, and the linked-device information of the terminal device is information about the linked device triggering the terminal device to establish or modify the Ethernet session. The terminal device sends the application program identifier or the linked-device information to the control plane network element, to notify the control plane network element that the Ethernet session is related to the application program identifier or the linked-device information. To be specific, the Ethernet session is used to transmit a data packet of the application program corresponding to the application program identifier, or the Ethernet session is used to transmit a data packet related to the device linked to the terminal device.

The application program identifier or the linked-device information may be carried in the session management request message, or may not be carried in the session management request message.

In a possible implementation, the terminal device sends a data network local area network identifier to the control plane network element, where the data network local area network identifier is an identifier of a local area network to which the terminal device belongs in a data network, and the data network local area network identifier may be cared in the session management request message, or may not be carried in the session management request message.

The control plane network element may send the data network local area network identifier to the user plane network element, so that the user plane network element may perform corresponding processing on the data packet when receiving the data packet corresponding to the Ethernet session. For example, for an uplink data packet, the user plane network element replaces the encapsulation identifier that is encapsulated in the uplink data packet and that corresponds to the Ethernet session with the data network local area network identifier, to transmit the uplink data packet to the corresponding data network local area network; and for downlink data, the user plane network element replaces the data network local area network identifier in the downlink data with the encapsulation identifier corresponding to the Ethernet session, to transmit the downlink data to the corresponding Ethernet session.

In a possible implementation, the terminal device sends a 5G local area network identifier to the control plane network element, where the 5G local area network identifier is an identifier of a 5G local area network to which the Ethernet session belongs, so that the control plane network element can determine, based on the 5G local area network identifier, the encapsulation identifier corresponding to the Ethernet session.

A sixth aspect of the embodiments of this application provides a terminal device, where the terminal device has functions for implementing the method provided in the fifth aspect. The functions may be implemented by hardware, or may be implemented by hardware executing corresponding software. The hardware or the software includes one or more modules corresponding to the foregoing functions.

In a possible implementation, the terminal device includes: a processing unit, configured to determine a first encapsulation identifier corresponding to an Ethernet session, and further configured to encapsulate an uplink data packet based on the first encapsulation identifier, where the uplink data packet is a data packet triggered by an application program bound to the Ethernet session; and a transceiver unit, configured to map, based on the first encapsulation identifier, the encapsulated data packet to the Ethernet session for transmission.

In a possible implementation, the terminal device includes: a processor, a transceiver, and a memory. The memory stores a computer program, where the computer program includes a program instruction. The processor is configured to invoke program code to perform the following operations: determining a first encapsulation identifier corresponding to an Ethernet session; encapsulating an uplink data packet based on the first encapsulation identifier, where the uplink data packet is a data packet triggered by an application program bound to the Ethernet session; and controlling the transceiver to map, based on the first encapsulation identifier, the encapsulated data packet to the Ethernet session for transmission.

Based on a same inventive concept, for a problem-resolving principle and beneficial effects of the terminal device, refer to the method and beneficial effects brought by the method in the fifth aspect. Therefore, for implementation of the apparatus, refer to the implementation of the method. Repeated parts are not described again.

A seventh aspect of the embodiments of this application provides a computer-readable storage medium. The computer-readable storage medium stores an instruction, and when the instruction is run on a computer, the computer is enabled to perform the method according to the fifth aspect.

An eighth aspect of the embodiments of this application provides a computer program product including an instruction. When the instruction is run on a computer, the computer is enabled to perform the method according to the fifth aspect.

A ninth aspect of the embodiments of this application provides a communication method, including:
in a process of establishing or modifying an Ethernet session, determining, by an access management network element, an encapsulation identifier corresponding to the Ethernet session; and
sending, by the access management network element, the encapsulation identifier corresponding to the Ethernet session to a control plane network element.

According to the ninth aspect of this application, in the process of establishing or modifying the Ethernet session, the access management network element determines the encapsulation identifier bound to the Ethernet session, and notifies the control plane network element of the encapsulation identifier bound to the Ethernet session, so that the control plane network element determines the encapsulation identifier bound to the Ethernet session, or the control plane network element sends the encapsulation identifier bound to the Ethernet session to a user plane network element, thereby ensuring that data is transmitted by using a correct Ethernet session.

In a possible implementation, the access management network element may autonomously allocate an encapsulation identifier to the Ethernet session, so that autonomy and flexibility of the access management network element can be improved.

In a possible implementation, the access management network element receives an encapsulation identifier from a terminal device, and determines the encapsulation identifier as the encapsulation identifier corresponding to the Ethernet session. When requesting to establish or modify an Ethernet session, the terminal device notifies the access management network element of an encapsulation identifier allocated by the terminal device to the Ethernet session, and the access management network element may use the encapsulation identifier allocated by the terminal device, as the encapsulation identifier corresponding to the Ethernet session. The encapsulation identifier allocated by the terminal device to the Ethernet session may be carried in a session management request message.

Same as Manner 2 in which the control plane network element determines the encapsulation identifier corresponding to the Ethernet session, when receiving the encapsulation identifier from the terminal device, the access management network element may determine whether the encapsulation identifier is available, to avoid a case in which two Ethernet sessions of the terminal device are bound to a same encapsulation identifier.

A manner in which the access management network element determines the encapsulation identifier corresponding to the Ethernet session is the same as Manner 1, Manner 2, Manner 3, or Manner 5 in which the control plane network element determines the encapsulation identifier corresponding to the Ethernet session. A difference lies in that after the access management network element determines the encapsulation identifier corresponding to the Ethernet session, the access management network element needs to notify the control plane network element of the encapsulation identifier corresponding to the Ethernet session.

In a possible implementation, the access management network element may alternatively receive an application program identifier from the terminal device or linked-device information from the terminal device, to send the application program identifier or the linked-device information to the control plane network element.

In a possible implementation, the access management network element may alternatively receive a data network local area network identifier from the terminal device, to send the data network local area network identifier to the control plane network element.

In a possible implementation, the access management network element may alternatively receive a 5G local area network identifier from the terminal device, determine the encapsulation identifier corresponding to the Ethernet session, and send the 5G local area network identifier and the encapsulation identifier to the control plane network element.

A tenth aspect of the embodiments of this application provides an access management network element. The access management network element has functions for implementing the method provided in the ninth aspect. The functions may be implemented by hardware, or may be implemented by hardware executing corresponding software. The hardware or the software includes one or more modules corresponding to the foregoing functions.

In a possible implementation, the access management network element includes: a processing unit, configured to: in a process of establishing or modifying an Ethernet session, determine an encapsulation identifier corresponding to the Ethernet session; and a transceiver unit, configured to send the encapsulation identifier corresponding to the Ethernet session to a control plane network element.

In a possible implementation, the access management network element includes, a processor, a transceiver, and a memory. The memory stores a computer program, where the computer program includes a program instruction. The processor is configured to invoke program code to perform the following operations: in a process of establishing or modifying an Ethernet session, determining an encapsulation identifier corresponding to the Ethernet session; and controlling the transceiver to send the encapsulation identifier corresponding to the Ethernet session to a control plane network element.

Based on a same inventive concept, for a problem-resolving principle and beneficial effects of the access management network element, refer to the method and beneficial effects brought by the method in the ninth aspect. Therefore, for implementation of the apparatus, refer to the implementation of the method. Repeated parts are not described again.

An eleventh aspect of the embodiments of this application provides a computer-readable storage medium. The computer-readable storage medium stores an instruction, and when the instruction is run on a computer, the computer is enabled to perform the method according to the ninth aspect.

A twelfth aspect of the embodiments of this application provides a computer program product including an instruction. When the computer program product is run on a computer, the computer is enabled to perform the method according to the ninth aspect.

A thirteenth aspect of the embodiments of this application provides a communication method, including:
   in a process of establishing or modifying an Ethernet session, determining, by a policy management network element, an encapsulation identifier corresponding to the Ethernet session and
   sending, by the policy management network element, the encapsulation identifier corresponding to the Ethernet session to a control plane network element.

According to the thirteenth aspect of this application, in the process of establishing or modifying the Ethernet session, the policy management network element determines the encapsulation identifier bound to the Ethernet session, and notifies the control plane network element or an access management network element of the encapsulation identifier bound to the Ethernet session, so that the control plane network element or the access management network element determines the encapsulation identifier bound to the Ethernet session, or the control plane network element sends the encapsulation identifier bound to the Ethernet session to a user plane network element, thereby ensuring that data is transmitted by using a correct Ethernet session.

In a possible implementation, the policy management network element may autonomously and dynamically allocate an encapsulation identifier to the Ethernet session, so that autonomy and flexibility of the policy management network element can be improved.

In a possible implementation, the policy management network element receives an encapsulation identifier from the control plane network element or the access management network element, and determines the encapsulation identifier as the encapsulation identifier corresponding to the Ethernet session.

In a possible implementation, when determining the encapsulation identifier corresponding to the Ethernet session, the policy management network element may update a URSP of a terminal device based on the encapsulation identifier corresponding to the Ethernet session, and send an updated URSP to the terminal device, so that the terminal device may learn, based on the updated URSP, an encapsulation identifier corresponding to an application program triggering establishment or modification of the Ethernet session.

In a possible implementation, the policy management network element receives an application program identifier or linked-device information from the control plane network element or the access management network element, to update the URSP of the terminal device. The policy management network element may alternatively obtain the application program identifier or the linked-device information in other manners, for example, obtain the application program identifier from an application function (AF) network element.

In a possible implementation, the policy management network element receives a 5G local area network identifier from the control plane network element or the access management network element, determines the encapsulation identifier corresponding to the Ethernet session based on the 5G local area network identifier and configuration information, and updates the URSP of the terminal device.

A fourteenth aspect of the embodiments of this application provides a policy management network element. The policy management network element has functions for implementing the method provided in the thirteenth aspect. The functions may be implemented by hardware, or may be implemented by hardware executing corresponding software. The hardware or the software includes one or more modules corresponding to the foregoing functions.

In a possible implementation, the policy management network element includes, a processing unit, configured to: in a process of establishing or modifying an Ethernet session, determine an encapsulation identifier corresponding to the Ethernet session; and a transceiver unit, configured to send the encapsulation identifier corresponding to the Ethernet session to a control plane network element.

In a possible implementation, the policy management network element includes: a processor, a transceiver, and a memory. The memory stores a computer program, where the computer program includes a program instruction. The processor is configured to invoke program code to perform the following operations: in a process of establishing or modifying an Ethernet session, determining an encapsulation identifier corresponding to the Ethernet session; and controlling the transceiver to send the encapsulation identifier corresponding to the Ethernet session to a control plane network element.

Based on a same inventive concept, for a problem-resolving principle and beneficial effects of the policy management network element, refer to the method and beneficial effects brought by the method in the thirteenth aspect. Therefore, for implementation of the apparatus, refer to the implementation of the method. Repeated parts are not described again.

A fifteenth aspect of the embodiments of this application provides a computer-readable storage medium. The computer-readable storage medium stores an instruction, and when the instruction is run on a computer, the computer is enabled to perform the method according to the ninth aspect.

A sixteenth aspect of the embodiments of this application provides a computer program product including an instruction. When the computer program product is run on a computer, the computer is enabled to perform the method according to the thirteenth aspect.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Figure 1:
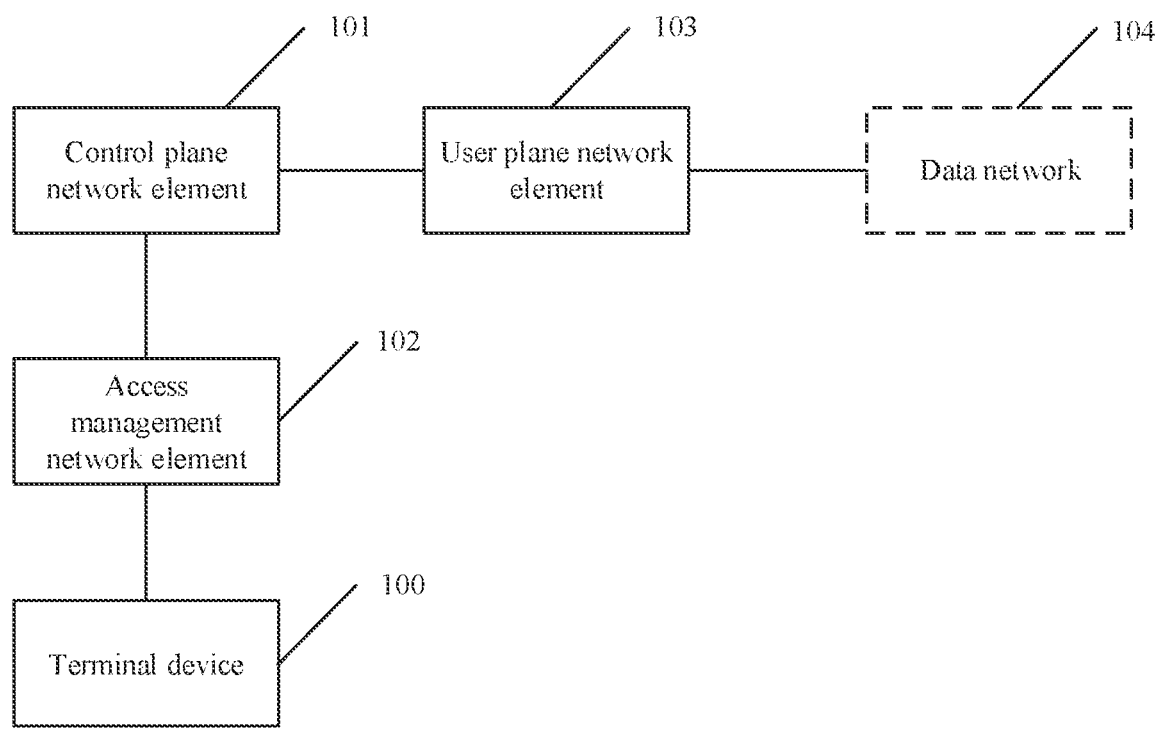
FIG. 1 is a schematic diagram of a network architecture to which an embodiment of this application is applied.

Terms or names involved in the embodiments of this application will be explained below.

An encapsulation identifier is used to encapsulate data packets transmitted on different Ethernet sessions. The Ethernet session may be established under triggering of an application program (APP) or linked-device information on a terminal device.

The encapsulation identifier may be a virtual local area network (VLAN) identifier (identification, ID), one VLAN is equivalent to a broadcast domain, one broadcast domain corresponds to one specific group, and different VLANs are isolated from each other. Applied to the embodiments of this application, a VLAN ID may be bound to an Ethernet session, one Ethernet session may be bound to at least one VLAN ID, and the VLAN ID bound to the Ethernet session is valid in a third Generation Partnership Project (3GPP) network, and is invalid outside the 3GPP network. In the embodiments of this application, the VLAN ID may be used to identify a VLAN bound to the Ethernet session.

The encapsulation identifier may be a 5G local area network (5G LAN) identifier, and may be used to dynamically identify a 5G local area network to which an Ethernet session of a terminal device belongs. For example, a terminal device 1 belongs to a 5G LAN ID 1 at a time point, and belongs to a 5G LAN ID 2 at another time point.

Alternatively, the encapsulation identifier may be another identifier. For example, an identifier may be determined based on a source MAC address, a destination MAC address, a VLAN tag, a VLAN type, or the like, and the identifier may be used as the encapsulation identifier. The terminal device may replace a corresponding field in a packet header of an uplink data packet with the identifier, to be specific, replace, with the identifier, a field, such as a source MAC address, a destination MAC address, a VLAN tag, or a VLAN type in the packet header of the uplink data packet.

In the embodiments of this application, the encapsulation identifier is described by using the VLAN ID as an example.

A data network local area network identifier is used to identify an identifier of a local area network to which the terminal device belongs in a data network, and is valid in the data network.

Linked-device information is used to indicate device information linked to the terminal device, in other words, information about a device linked to the terminal device. For example, a terminal device 1 is a mobile phone 1, and the mobile phone 1 performs network access by using 4G or 5G data traffic. The mobile phone 1 opens a personal hotspot, and a mobile phone 2 connects to the personal hotspot of the mobile phone 1 to perform network access. In this case, the linked-device information is device information of the mobile phone 2, and may include but is not limited to information such as an identifier, a MAC address, or an IP address of the mobile phone 2.

A user equipment route selection policy (URSP) is used to indicate how the terminal device selects a routing policy. Applied to the embodiments of this application, the URSP may include one or more application program identifiers or one or more pieces of linked-device information. The URSP may further include an encapsulation identifier bound to the application program identifier or the linked-device information. The URSP may further include a 5G LAN ID. For example, the URSP may be shown in the following Table 1:

TABLE 1

| Application program identifier | Encapsulation identifier | 5G LAN ID |
| --- | --- | --- |
| APP 1 | VLAN 1 | 5G LAN 1 |
| APP 2 | VLAN 2 | 5G LAN 2 |
| APP 3 | VLAN 2 | 5G LAN 3 |

FIG. 1 is a schematic diagram of a network architecture to which an embodiment of this application is applied. The network architecture includes a terminal device 100, a control plane network element 101, an access management network element 102, and a user plane network element 103, and may further include a data network 104.

The terminal device 100 may be UE, a mobile station (MS), a mobile terminal (MT), or the like, and is a device providing voice and/or data connectivity to a user, for example, a handheld device or a vehicle-mounted device having a wireless connection function. Currently, some terminals are, for example, a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, and a wireless terminal in a smart home.

The control plane network element 101 is a control plane network element in a core network, and is configured to manage an Ethernet session of the terminal device. Applied to this embodiment of this application, the control plane network element 101 is configured to determine an encapsulation identifier bound to the Ethernet session, and notify the user plane network element 103 of the determined encapsulation identifier bound to the Ethernet session.

The access management network element 102 is an access management network element in the core network, and is configured to perform access management and mobility management on the terminal device. Applied to this embodiment of this application, the access management network element 102 may be configured to allocate an encapsulation identifier to the Ethernet session, may be further configured to receive a session management request from the terminal device 100, and may be further configured to send the session management request to the control plane network element 101.

The user plane network element 103 is a user plane network element in the core network, and is configured to transmit service data. Applied to this embodiment of this application, the user plane network element 103 is configured to receive the encapsulation identifier bound to the Ethernet session from the control plane network element 101, and is further configured to: when receiving a data packet corresponding to the Ethernet session, process the data packet based on the encapsulation identifier bound to the Ethernet session. For example, for an uplink data packet, the user plane network element 103 deletes, from the uplink data packet, the encapsulation identifier that is bound to the Ethernet session and that is encapsulated in the uplink data packet; and for a downlink data packet, the user plane network element 103 adds the encapsulation identifier bound to the Ethernet session to the downlink data packet. If used for 5G LAN communications, the user plane network element 103 may determine other Ethernet sessions in a 5G LAN based on the encapsulation identifier, to forward a data packet among the Ethernet sessions.

The data network 104 is a data network that provides a business service to a user. Generally, a client is located at the terminal device, and a server is located in the data network. The data network may be a private network such as a local area network, or an external network that is not managed and controlled by an operator, for example, the Internet, or a dedicated network jointly deployed by operators, for example, a dedicated network deployed to configure an IP multimedia network subsystem (IMS) service.

The foregoing core network is responsible for maintaining subscription data of a mobile network, managing a network element of the mobile network, and providing functions such as session management, mobility management, policy management, and security authentication to the terminal 100. When the terminal device 100 is attaching, the core network provides network entry authentication for the terminal device 100; when the terminal device 100 has a service request, the core network allocates a network resource to the terminal device 100; when the terminal device 100 moves, the core network updates the network resource for the terminal device 100; when the terminal device 100 is idle, the core network provides a fast recovery mechanism for the terminal device 100; when the terminal device 100 is detached, the core network releases the network resource for the terminal device 100, and when the terminal device 100 has service data, the core network provides a data routing function for the terminal device 100, for example, the core network forwards uplink data to the data network, or receives downlink data from the data network, and forwards the downlink data to an access network, to send the downlink data to the terminal device 100. The core network may be a core network in a 5G system, or a core network in a future communications system.

Figure 2:
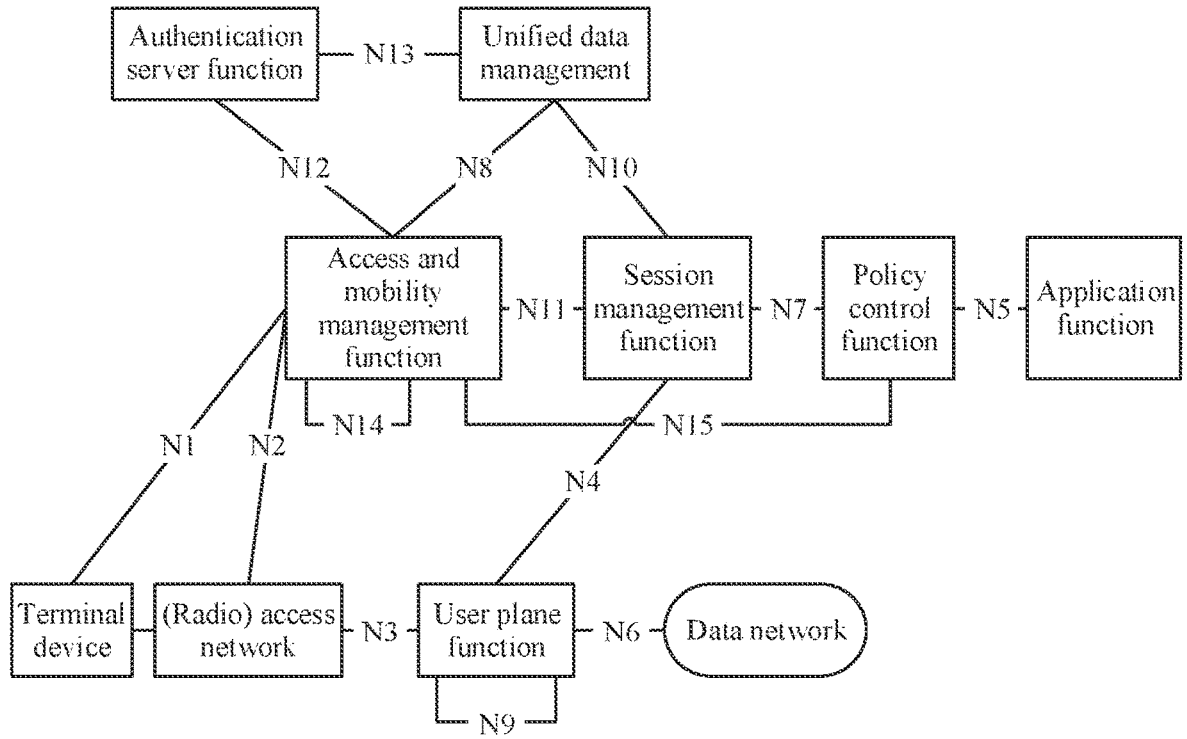
FIG. 2 is a schematic diagram of a network architecture of a 5th generation mobile communications system.

FIG. 2 is a schematic diagram of a network architecture of a 5G system. The schematic diagram of the network architecture includes an authentication server function (AUSF), unified data management (UDM) function, access and mobility management function (AMF), a session management function (SMF), a policy control function (PCF), an application function (AF), a terminal device, an access network (AN), a user plane function (UPF), and a data network (DN). The access network may be a radio access network (RAN).

An interface between the terminal device and the AMF is an N interface, an interface between the (R)AN and the AMF is an N2 interface, an interface between the (R)AN and the UPF is an N3 interface, an interface between the UPF and the SMF is an N4 interface, an interface between the PCF and the AF is an N5 interface, an interface between the UPF and the DN is an N6 interface, an interface between the SMF and the PCF is an N7 interface, an interface between the AMF and the UDM is an N8 interface, an interface between UPFs is an N9 interface, an interface between the UDM and the SMF is an N10 interface, an interface between the SMF and the AMF is an N11 interface, an interface between the AMF and the AUSF is an N12 interface, an interface between the AUSF and the UDM is an N13 interface, an interface between AMFs is an N14 interface, and an interface between the AMF and the PCF is an N15 interface.

The terminal device is an ingress for interaction between a mobile user and a network, and can provide a basic computing capability and storage capability, display a service window to the user, and receive operational input of the user. The terminal device establishes a signal connection and a data connection to the (R)AN, to transmit a control signal and service data to the mobile network.

The (R)AN is similar to a base station in a conventional network and is deployed near the terminal device, provides a network access function to an authorized user in a specific area, and can transmit user data based on a user level and a service requirement by using transmission tunnels of different quality. The (R)AN can manage resources of the (R)AN, appropriately use the resources, provide an access service to the terminal device based on a requirement, and forward a control signal and user data between the terminal and the core network.

The UPF, the AUSF, the AMF, the SMF, the UDM, the PCF, and the AF shown in FIG. 2 are network elements on a core network side. The UPF is a user plane network element on the core network side.

The UPF forwards a user data packet based on a routing rule of the SMF. The AUSF is responsible for security authentication of the terminal. The AMF is responsible for access management and mobility management of the terminal. The SMF is responsible for session management of the terminal. The UDM is responsible for subscriber subscription information management. The PCF is responsible for user policy management. The AF is responsible for user application management.

The control plane network element 101 shown in FIG. 1 includes the SMF shown in FIG. 2, or is a network element having a same function as that of the SMF in a future core network. The access management network element 102 shown in FIG. 1 may be the AMF shown in FIG. 2, or is a network element having a same function as that of the AMF in the future core network. The user plane network element 103 shown in FIG. 1 may be the UPF shown in FIG. 2, or is a network element having a same function as that of the UPF in the future core network.

The embodiments of this application further involve a policy management network element. The policy management network element may be the PCF shown in FIG. 2, or is a network element having a same function as that of the PCF in the future core network.

It should be noted that the terms such as the control plane network element, the user plane network element, the access management network element, and the policy management network element do not constitute a limitation on the embodiments of this application.

The embodiments of this application are described by using an example in which the control plane network element 101 is the SMF, the access management network element is the AMF, the user plane network element 103 is the UPF, and the policy management network element is the PCF.

In a scenario in which a plurality of Ethernet sessions share a MAC address of the terminal device, data packets generated by different application programs or linked devices cannot be accurately bound to different Ethernet sessions for transmission. In view of the defect, the embodiments of this application provide a communication method and an apparatus. In the scenario, it can be ensured that different data packets are transmitted by using correct Ethernet sessions.

In the scenario in which the plurality of Ethernet sessions share the MAC address of the terminal device, for example, in a session service connection (SSC) mode 3, a new Ethernet session and an old Ethernet session having a same attribute may exist on the terminal device at the same time, and therefore, a plurality of Ethernet sessions share the MAC address. For another example, the terminal device belongs to a plurality of 5G LANs, and for isolation, at least one Ethernet session needs to be established for each 5G LAN. In this case, a plurality of Ethernet sessions share the MAC address.

The following describes in detail a communication method according to an embodiment of this application.

Figure 3:
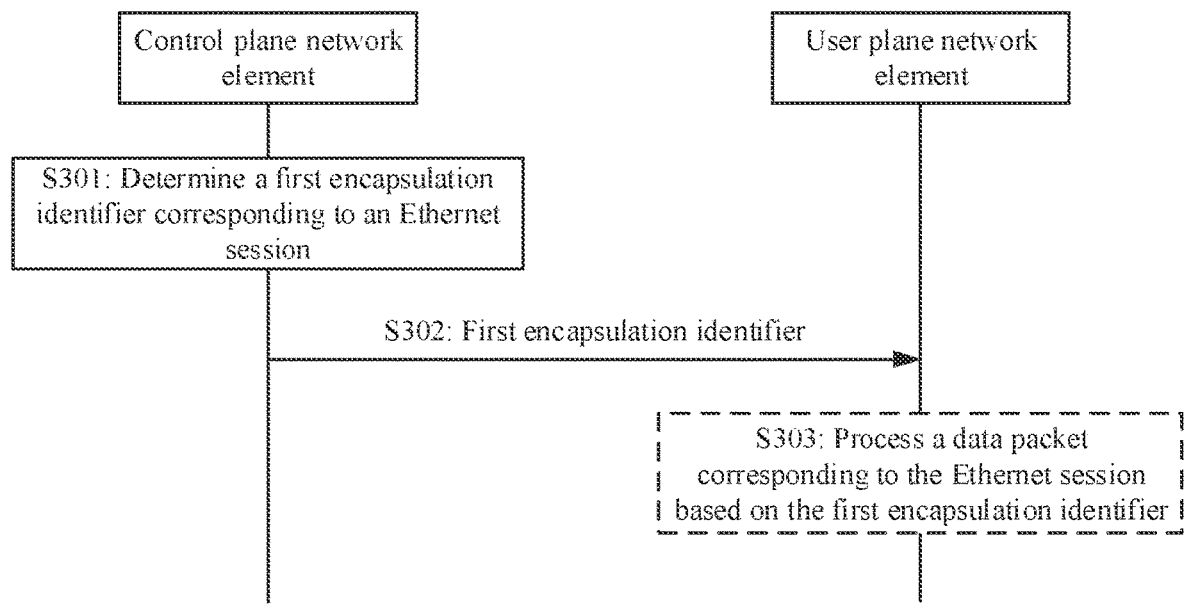
FIG. 3 is a schematic flowchart of a communication method according to Embodiment 1 of this application.

FIG. 3 is a schematic flowchart of a communication method according to Embodiment 1 of this application. Embodiment 1 is mainly described from a perspective of a control plane network element, and may include but is not limited to the following steps.

Step S301: The control plane network element determines a first encapsulation identifier corresponding to an Ethernet session.

An encapsulation identifier corresponding to the Ethernet session is an encapsulation identifier bound to the Ethernet session. The Ethernet session may be any Ethernet session initiated by a terminal device or a network element on a core network side. This embodiment of this application is described by using one Ethernet session as an example. The Ethernet session may be established or modified under triggering of an application program on the terminal device, or is established or modified under triggering of an application program on a device linked to the terminal device.

In a process of establishing or modifying the Ethernet session, the control plane network element determines the first encapsulation identifier corresponding to the Ethernet session, to distinguish Ethernet sessions on the terminal device. In other words, when receiving a session management request message from the terminal device, the control plane network element determines the first encapsulation identifier corresponding to the Ethernet session. The session management request message is used to request to establish or modify the Ethernet session.

The control plane network element may determine the first encapsulation identifier corresponding to the Ethernet session in the following manners.

Manner 1: The control plane network element may determine the first encapsulation identifier corresponding to the Ethernet session based on a second encapsulation identifier sent by the terminal device. The control plane network element receives the second encapsulation identifier from the terminal device. The second encapsulation identifier is an encapsulation identifier allocated by the terminal device to the Ethernet session. There may be one or more second encapsulation identifiers. The second encapsulation identifier may be carried in the session management request message of the Ethernet session.

If there is one second encapsulation identifier, the control plane network element may directly determine the second encapsulation identifier as the first encapsulation identifier corresponding to the Ethernet session, or may determine whether the second encapsulation identifier is available, and determine the second encapsulation identifier as the first encapsulation identifier corresponding to the Ethernet session when the second encapsulation identifier is available. That the control plane network element determines whether the second encapsulation identifier is available includes: determining whether the second encapsulation identifier is bound to another Ethernet session of the terminal device, or whether a value of the second encapsulation identifier is within a valid range, for example, 1-4094, or whether the second encapsulation identifier has a special function, or whether the second encapsulation identifier is bound to a 5G LAN in which the Ethernet session is located. If the second encapsulation identifier is not bound to another Ethernet session of the terminal device, the value of the second encapsulation identifier is within the valid range, the second encapsulation identifier does not have a special function, and the second encapsulation identifier is bound to the 5G LAN in which the Ethernet session is located, the control plane network element may determine that the second encapsulation identifier is available.

If there are a plurality of second encapsulation identifiers, the control plane network element may select one available second encapsulation identifier from the plurality of second encapsulation identifiers, where the selected second encapsulation identifier is not bound to another Ethernet session of the terminal device, the value of the selected second encapsulation identifier is within the valid range, the selected second encapsulation identifier does not have a special function, and the second encapsulation identifier is bound to the 5G LAN in which the Ethernet session is located. The control plane network element determines the selected second encapsulation identifier as the first encapsulation identifier corresponding to the Ethernet session.

After determining the first encapsulation identifier corresponding to the Ethernet session, the control plane network element may send a session management response message to the terminal device, where the session management response message is used to instruct the control plane network element to determine the second encapsulation identifier as the first encapsulation identifier corresponding to the Ethernet session. If there is one second encapsulation identifier, the control plane network element notifies, by using the session management response message, the terminal device that the second encapsulation identifier is the encapsulation identifier bound to the Ethernet session. In this case, the session management response message may not carry the encapsulation identifier determined by the control plane network element. If there are a plurality of second encapsulation identifiers, the control plane network element notifies, by using the session management response message, the terminal device of the encapsulation identifier bound to the Ethernet session. In this case, the session management response message of the Ethernet session may carry the encapsulation identifier determined by the control plane network element. It may be understood that the control plane network element notifies, by using the session management response message of the Ethernet session, the terminal device of the encapsulation identifier bound to the Ethernet session.

When receiving the session management response message of the Ethernet session, the terminal device may learn of the first encapsulation identifier determined by the control plane network element for the Ethernet session, so that when sending an uplink data packet of the Ethernet session, the terminal device encapsulates the uplink data packet based on the first encapsulation identifier. For example, the terminal device adds a field to a data packet header of the uplink data packet, content of the field is the first encapsulation identifier, and a location of the field may be behind a location of a source MAC address field and a location of a destination MAC address field.

The session management response message may be a session establishment response message, or a session modification response message, depending on the session management request message sent by the terminal device. If the session management request message is a session establishment request message, the session management response message is the session establishment response message. If the session management request message is a session modification request message, the session management response message is the session modification response message. The session management request message of the Ethernet session includes the second encapsulation identifier determined by the terminal device.

Manner 2: The control plane network element allocates an encapsulation identifier to the Ethernet session, and determines the allocated encapsulation identifier as the first encapsulation identifier corresponding to the Ethernet session. After determining the first encapsulation identifier corresponding to the Ethernet session, the control plane network element may send the first encapsulation identifier corresponding to the Ethernet session to the terminal device, to notify the terminal device of the encapsulation identifier bound to the Ethernet session. The control plane network element directly determines the encapsulation identifier bound to the Ethernet session, so that it can be ensured that the allocated encapsulation identifier is valid, and further, a case in which two Ethernet sessions of the terminal device are bound to a same encapsulation identifier can be avoided.

The terminal device may be notified, by using the session management response message, of the encapsulation identifier allocated by the control plane network element to the Ethernet session. In this case, the session management response message may carry the encapsulation identifier allocated by the control plane network element.

Manner 3: The control plane network element may receive a first message sent by an access management network element, where the first message includes a third encapsulation identifier, and determine the third encapsulation identifier as the first encapsulation identifier corresponding to the Ethernet session. The third encapsulation identifier is an encapsulation identifier determined by the access management network element for the Ethernet session, and may be an encapsulation identifier autonomously allocated by the access management network element to the Ethernet session, or an encapsulation identifier received by the access management network element from a policy management network element, or an encapsulation identifier received by the access management network element from the terminal device. The access management network element determines the encapsulation identifier bound to the Ethernet session, and notifies the control plane network element of the encapsulation identifier, so that processing load of the control plane network element can be reduced to some extent.

The first message may be an Nsmf_PDUSession_CreateSMContext Request. The first message may further include a session identifier of the Ethernet session.

The first message may be an Nsmf_PDUSession_UpdateSMContext Request. The first message may further include a session identifier of the Ethernet session.

Manner 4: The control plane network element may receive a second message sent by a policy management network element, where the second message includes a fourth encapsulation identifier, and determine the fourth encapsulation identifier as the first encapsulation identifier corresponding to the Ethernet session. The fourth encapsulation identifier is an encapsulation identifier determined by the policy management network element for the Ethernet session, and may be an encapsulation identifier autonomously allocated by the policy management network element to the Ethernet session. The policy management network element determines the encapsulation identifier bound to the Ethernet session, and notifies the control plane network element of the encapsulation identifier, so that processing load of the control plane network element can be reduced to some extent.

The second message may be an Npcf_SMPolicyControl_Create Response. The second message may further include a session identifier of the Ethernet session.

The second message may be an Npcf_SMPolicyControl_Update Response. The second message may further include a session identifier of the Ethernet session.

In Manner 3 and Manner 4, the control plane network element may notify, by using a session management response message, the terminal device of the encapsulation identifier determined by the control plane network element. In this case the session management response message may carry the encapsulation identifier determined by the control plane network element.

Manner 5: The control plane network element may determine the first encapsulation identifier of the Ethernet session based on a 5G local area network identifier sent by the terminal device.

For example, a first Ethernet session of a first terminal device and a second Ethernet session of a second terminal device belong to a same 5G LAN group and have a same 5G LAN ID. The control plane network element determines that an encapsulation identifier corresponding to the first Ethernet session established by the first terminal device is 1, and the second terminal device determines that an encapsulation identifier corresponding to the second Ethernet session established by the second terminal device is 2, and reports the encapsulation identifier 2 to the control plane network element. The first Ethernet session of the first terminal device and the second Ethernet session of the second terminal device belong to the same 5G LAN group, but the encapsulation identifiers bound to the sessions are different. In this case, the control plane network element may modify the encapsulation identifier 1 and/or the encapsulation identifier 2, so that when different Ethernet sessions established by different terminal devices belong to the same 5G LAN group, the different Ethernet sessions may be bound to a same encapsulation identifier. Therefore, when forwarding a data packet, the user plane network element may forward the data packet among the Ethernet sessions having the same encapsulation identifier, thereby implementing 5G LAN communication. It may be understood that, the 5G LAN ID is used by the control plane network element to assist in determining the encapsulation identifier corresponding to the Ethernet session.

If an encapsulation identifier reported by a terminal device in the same 5G LAN group for an Ethernet session is different from the encapsulation identifier finally determined by the control plane network element, the control plane network element may notify the terminal device by using the session management response message. In this case, the session management response message carries the encapsulation identifier that is finally determined by the control plane network element for the Ethernet session of the terminal device, so that the terminal device processes an uplink data packet based on the encapsulation identifier.

By using the foregoing five manners, the terminal device may learn of the encapsulation identifier bound to the Ethernet session, that is, the first encapsulation identifier.

The terminal device encapsulates an uplink data packet by using the first encapsulation identifier, where the uplink data packet is a data packet triggered by the application program or the linked device bound to the Ethernet session. When the uplink data packet is encapsulated by using the first encapsulation identifier, a MAC address of the terminal device may be further encapsulated. The terminal device sends the encapsulated data packet by using the Ethernet session. To be specific, the terminal device maps the uplink data packet to the Ethernet session corresponding to the encapsulation identifier encapsulated in the uplink data packet, to send the uplink data packet to the user plane network element, and the user plane network element processes the uplink data packet and then sends the processed uplink data packet to a data network. In this way, the terminal device maps the uplink data packet to the Ethernet session corresponding to the encapsulation identifier encapsulated in the uplink data packet, so that uplink data packets in which different encapsulation identifiers are encapsulated may be transmitted by using different Ethernet sessions, so that a plurality of Ethernet sessions are distinguished and it can be ensured that data is transmitted by using a correct Ethernet session.

Step S302: The control plane network element sends the first encapsulation identifier corresponding to the Ethernet session to the user plane network element. Correspondingly, the user plane network element receives the first encapsulation identifier corresponding to the Ethernet session from the control plane network element.

When determining the first encapsulation identifier corresponding to the Ethernet session, the control plane network element sends the first encapsulation identifier corresponding to the Ethernet session to the user plane network element.

In a possible implementation, when determining the first encapsulation identifier corresponding to the Ethernet session, the control plane network element may send the first encapsulation identifier corresponding to the Ethernet session to the policy management network element, so that the policy management network element updates a URSP based on the first encapsulation identifier corresponding to the Ethernet session. To be specific, the policy management network element may add, to the URSP, the encapsulation identifier corresponding to the application program identifier or the linked-device information (the application program identifier or the linked-device information is bound to the Ethernet session, and the Ethernet session is bound to the encapsulation identifier, so that the encapsulation identifier corresponding to the application program identifier or the linked-device information is obtained).

Step S303: The user plane network element processes a data packet corresponding to the Ethernet session based on the first encapsulation identifier.

When receiving the data packet corresponding to the Ethernet session, the user plane network element processes the data packet based on the first encapsulation identifier. The data packet corresponding to the Ethernet session is a data packet transmitted by using the Ethernet session.

For an uplink data packet corresponding to the Ethernet session, to be specific, a data packet sent by the terminal device to the data network by using a network element on a core network side, the uplink data packet carries the first encapsulation identifier corresponding to the Ethernet session. When receiving the uplink data packet, the user plane network element deletes the first encapsulation identifier carried in the uplink data packet from the uplink data packet, or replaces the first encapsulation identifier carried in the uplink data packet with a data network local area network identifier.

For a downlink data packet corresponding to the Ethernet session, to be specific, a data packet sent by the data network to the terminal device by using a core network element, the downlink data packet carries a data network local area network identifier. When receiving the downlink data packet, the user plane network element replaces the data network local area network identifier carried in the downlink data packet with the first encapsulation identifier of the Ethernet session, or adds the first encapsulation identifier of the Ethernet session to the downlink data packet.

For a data packet on an Ethernet session belonging to a 5G LAN, during forwarding, the data packet may be forwarded among Ethernet sessions that have a same encapsulation identifier.

In the embodiment shown in FIG. 3, the control plane network element determines the first encapsulation identifier corresponding to the Ethernet session, and sends the determined first encapsulation identifier corresponding to the Ethernet session to the user plane network element. In this way, when receiving a data packet, the user plane network element may process the data packet. The first encapsulation identifier is bound to the Ethernet session, so that different Ethernet sessions may be distinguished by using different bound encapsulation identifiers, and further, it can be ensured that data is transmitted by using a correct Ethernet session.

Figure 4:
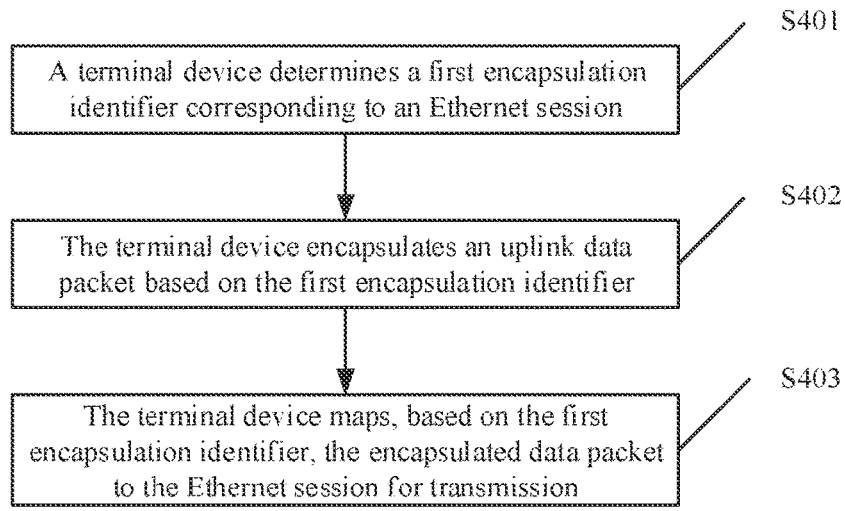
FIG. 4 is a schematic flowchart of a communication method according to Embodiment 2 of this application.

FIG. 4 is a schematic flowchart of a communication method according to Embodiment 2 of this application. Embodiment 2 is mainly described from a perspective of a terminal device, and may include but is not limited to the following steps.

Step S401: The terminal device determines a first encapsulation identifier corresponding to an Ethernet session.

The terminal device may determine the first encapsulation identifier corresponding to the Ethernet session in the following manners.

Manner 1: When determining that the Ethernet session needs to be established or modified, the terminal device may obtain an encapsulation identifier corresponding to an application program from a URSP, where the application program is an application program triggering establishment or modification of the Ethernet session, and the URSP may include a correspondence between each of one or more application program identifiers and an encapsulation identifier. The terminal device matches an identifier of the application program with the URSP, and if the identifier of the application program exists in the URSP, the terminal device obtains an encapsulation identifier corresponding to the application program identifier, and uses the encapsulation identifier corresponding to the application program identifier as a second encapsulation identifier corresponding to the application program. The terminal device may send the second encapsulation identifier to a control plane network element by using a session management request message. The control plane network element may directly determine the second encapsulation identifier as the encapsulation identifier bound to the Ethernet session, or may determine whether the second encapsulation identifier is available, and when the second encapsulation identifier is available, determine the second encapsulation identifier as the encapsulation identifier bound to the Ethernet session.

When determining the encapsulation identifier bound to the Ethernet session, the control plane network element may send a session management response message to the terminal device. When receiving the session management response message, the terminal device may determine that the reported second encapsulation identifier is the encapsulation identifier bound to the Ethernet session.

It may be understood that the URSP includes a correspondence between an application program identifier and an encapsulation identifier, and an application program is bound to an Ethernet session, so that an encapsulation identifier corresponding to the Ethernet session may be obtained.

Manner 2: The terminal device allocates an encapsulation identifier to the Ethernet session. The encapsulation identifier is different from an encapsulation identifier bound to another Ethernet session of the terminal device. For ease of description, the encapsulation identifier is referred to as a second encapsulation identifier. The terminal device may send the second encapsulation identifier to a control plane network element by using a session management request message. The control plane network element may directly determine the second encapsulation identifier as the encapsulation identifier bound to the Ethernet session, or may determine whether the second encapsulation identifier is available, and when the second encapsulation identifier is available, determine the second encapsulation identifier as the encapsulation identifier bound to the Ethernet session.

When determining the encapsulation identifier bound to the Ethernet session, the control plane network element may send a session management response message to the terminal device. When receiving the session management response message, the terminal device may determine that the reported second encapsulation identifier is the encapsulation identifier bound to the Ethernet session.

Manner 3: A session management request message sent by the terminal device to a control plane network element does not carry a second encapsulation identifier. The terminal device receives a third encapsulation identifier from a network element on a core network side, and determines the third encapsulation identifier as the first encapsulation identifier corresponding to the Ethernet session. In other words, the terminal device directly determines the encapsulation identifier sent by the network element on the core network side as the second encapsulation identifier corresponding to the Ethernet session.

The network element on the core network side may be the control plane network element. The third encapsulation identifier may be an encapsulation identifier autonomously allocated by the control plane network element, or an encapsulation identifier received by the control plane network element from an access management network element, or an encapsulation identifier received by the control plane network element from a policy management network element. The third encapsulation identifier may be carried in a session management response message sent by the control plane network element to the terminal device, so that the terminal device may learn of a fourth encapsulation identifier bound to the Ethernet session.

The network element on the core network side may be the access management network element. The third encapsulation identifier may be an encapsulation identifier autonomously allocated by the access management network element, or an encapsulation identifier received by the access management network element from a policy management network element.

Step S402: The terminal device encapsulates an uplink data packet based on the first encapsulation identifier.

The terminal device adds the first encapsulation identifier to a data packet header of the uplink data packet, and adds a MAC address of the terminal device to the data packet header of the uplink data packet.

In a possible implementation, the uplink data packet is a data packet triggered by an application program bound to the Ethernet session, and the application program bound to the Ethernet session is the application program triggering establishment or modification of the Ethernet session. Alternatively, the uplink data packet may be a data packet triggered by a linked device bound to the Ethernet session. The URSP may further include a correspondence between linked-device information and an encapsulation identifier, so that the terminal device may obtain an encapsulation identifier corresponding to the linked device from the URSP.

In a possible implementation, the uplink data packet may be a data packet triggered by an application program bound to the Ethernet session, or a data packet triggered by an application program that is bound to the Ethernet session and that is on a linked device linked to the terminal device.

Step S403: The terminal device maps, based on the first encapsulation identifier, the encapsulated data packet to the Ethernet session for transmission.

The terminal device maps, based on a correspondence between the first encapsulation identifier and the Ethernet session, the encapsulated data packet to the Ethernet session for transmission.

Figure 5:
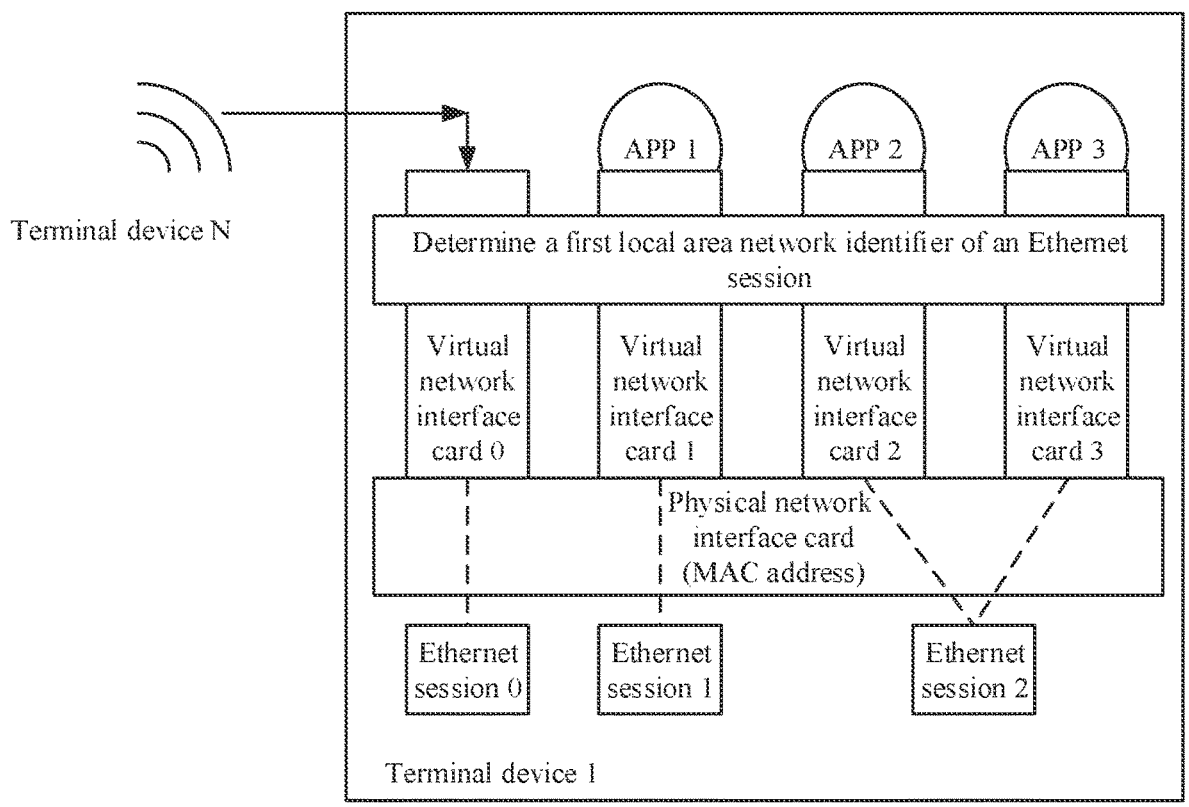
FIG. 5 is an example diagram of processing by a terminal device according to an embodiment of this application.

FIG. 5 is an example diagram of processing by a terminal device according to an embodiment of this application. A terminal device N indicates a device linked to a terminal device 1, in other words, a linked device of the terminal device 1, and an APP 1, an APP 2, and an APP 3 are three application programs on the terminal device 1. It is assumed that the terminal device 1 binds the linked device to a virtual network interface card 0 of a VLAN, and an ID of the VLAN is 0. In other words, the linked device is bound to the VLAN ID 0. The linked device corresponds to an Ethernet session 0. In this case, an encapsulation identifier bound to the Ethernet session 0 is the VLAN ID 0. The terminal device 1 binds the APP 1 to a virtual network interface card 1 of a VLAN, and an ID of the VLAN is 1. In other words, the APP 1 is bound to the VLAN ID 1. The APP 1 corresponds to an Ethernet session 1. In this case, an encapsulation identifier bound to the Ethernet session 1 is the VLAN ID 1. The terminal device 1 binds the APP 2 to a virtual network interface card 2 of a VLAN, and an ID of the VLAN is 2. In other words, the APP 2 is bound to the VLAN ID 2. The APP 2 corresponds to an Ethernet session 2. In this case, an encapsulation identifier bound to the Ethernet session 2 is the VLAN ID 2. The terminal device 1 binds the APP 3 to a virtual network interface card 3 of a VLAN, and an ID of the VLAN is 3. In other words, the APP 3 is bound to the VLAN ID 3. The APP 3 corresponds to the Ethernet session 2. In this case, an encapsulation identifier bound to the Ethernet session 2 is the VLAN ID 3. The Ethernet session 2 is bound to two encapsulation identifiers.

If an uplink data packet triggered by the linked device exists, the terminal device 1 encapsulates the VLAN ID 0 into the uplink data packet when the uplink data packet passes through the virtual network interface card 0, and the terminal device 1 encapsulates a MAC address of the terminal device 1 into the uplink data packet when the uplink data packet passes through a physical network interface card; and then the terminal device 1 maps the uplink data packet to the Ethernet session 0 based on a correspondence between the VLAN ID 0 and the Ethernet session 0, and transmits the uplink data packet by using the Ethernet session 0.

If an uplink data packet triggered by the APP 1 exists, the terminal device 1 encapsulates the VLAN ID 1 into the uplink data packet when the uplink data packet passes through the virtual network interface card 1, and the terminal device 1 encapsulates the MAC address of the terminal device 1 into the uplink data packet when the uplink data packet passes through the physical network interface card; and then the terminal device 1 maps the uplink data packet to the Ethernet session 1 based on a correspondence between the VLAN ID 1 and the Ethernet session 1, and transmits the uplink data packet by using the Ethernet session 1.

If an uplink data packet triggered by the APP2 exists, the terminal device 1 encapsulates the VLAN ID 2 into the uplink data packet when the uplink data packet passes through the virtual network interface card 2, and the terminal device 1 encapsulates the MAC address of the terminal device 1 into the uplink data packet when the uplink data packet passes through the physical network interface card; and then the terminal device 1 maps the uplink data packet to the Ethernet session 2 based on a correspondence between the VLAN ID 2 and the Ethernet session 2, and transmits the uplink data packet by using the Ethernet session 2.

If an uplink data packet triggered by the APP 3 exists, the terminal device 1 encapsulates the VLAN ID 3 into the uplink data packet when the uplink data packet passes through the virtual network interface card 2, and the terminal device 1 encapsulates the MAC address of the terminal device 1 into the uplink data packet when the uplink data packet passes through the physical network interface card; and then the terminal device 1 maps the uplink data packet to the Ethernet session 2 based on a correspondence between the VLAN ID 3 and the Ethernet session 2, and transmits the uplink data packet by using the Ethernet session 2.

It may be understood that one Ethernet session may be bound to at least one encapsulation identifier, for example, may be bound to at least one VLAN ID. In this case, a quantity of first encapsulation identifiers and a quantity of second encapsulation identifiers are not limited to one.

In a possible implementation, when establishment or modification of the Ethernet session is completed and an application program is ready to send an uplink data packet, the terminal device obtains an encapsulation identifier corresponding to the application program or a linked device from the URSP or preset configuration information, in other words, determines an encapsulation identifier of the application program or the linked device triggering establishment or modification of the Ethernet session, where the URSP or the preset configuration information may include a correspondence between each of one or more application program identifiers and an encapsulation identifier or include a correspondence between each of one or more linked devices and an encapsulation identifier. The terminal device encapsulates the uplink data packet based on the encapsulation identifier corresponding to the application program or the linked device, to be specific, encapsulates the encapsulation identifier corresponding to the application program or the linked device into the uplink data packet corresponding to the application program or the linked device. Then, the terminal device sends the encapsulated uplink data packet by using the Ethernet session corresponding to the application program or the linked device.

It may be understood that an application program triggers establishment of an Ethernet session, the application program is bound to an encapsulation identifier, a data packet needing to be transmitted by the application program is encapsulated by using the encapsulation identifier, and the encapsulated data packet is transmitted by using the Ethernet session.

In the embodiment shown in FIG. 4, the terminal device determines the first encapsulation identifier corresponding to the Ethernet session, so that the terminal device can transmit, by using the Ethernet session, the data packet in which the first encapsulation identifier is encapsulated, so that different Ethernet sessions are distinguished, and further, it can be ensured that uplink data is transmitted by using a correct Ethernet session.

Figure 6:
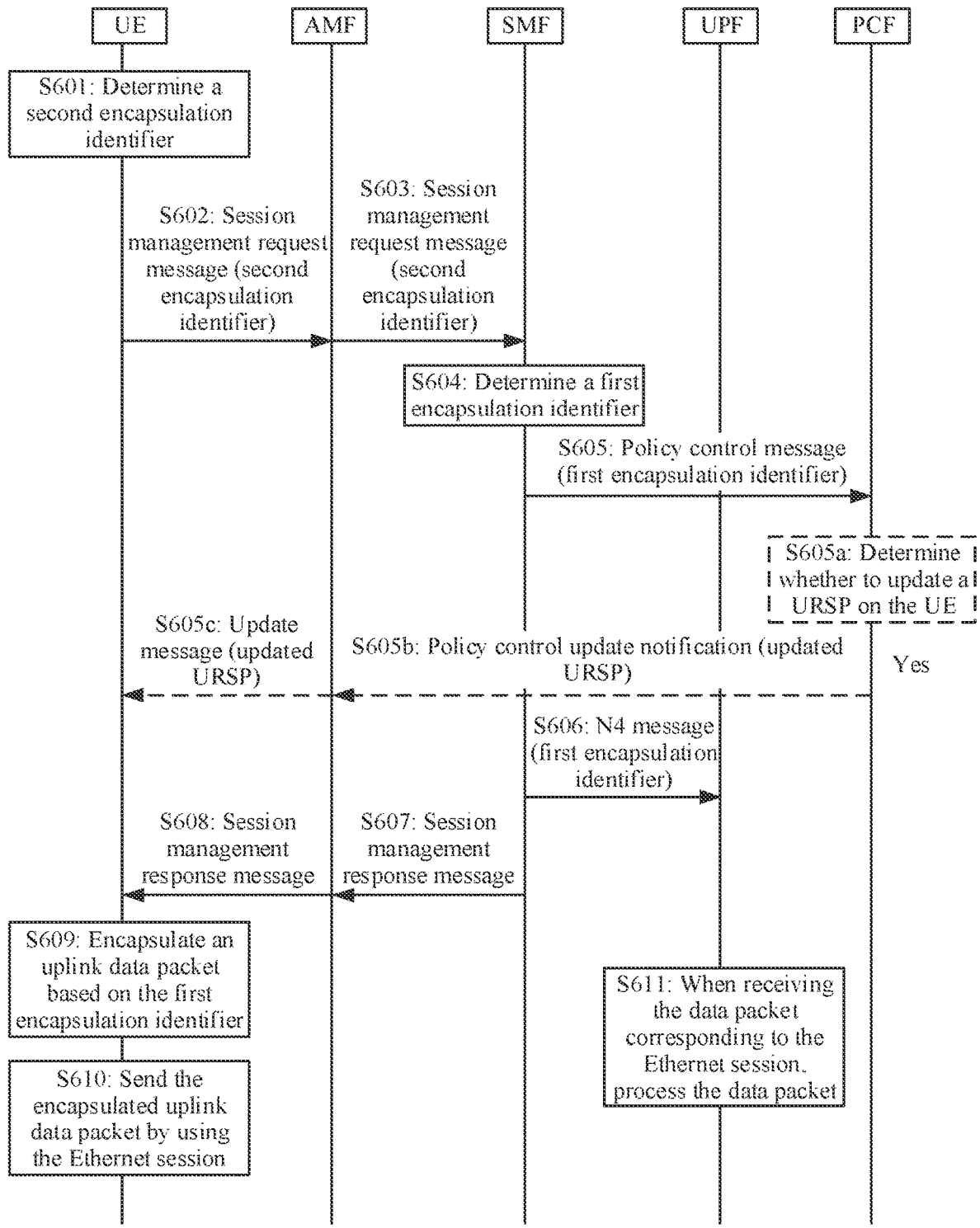
FIG. 6 is a schematic flowchart of a communication method according to Embodiment 3 of this application.

FIG. 6 is a schematic flowchart of a communication method according to Embodiment 3 of this application. Embodiment 3 is described from a perspective of interaction among UE, an AMF, an SMF, a UPF, and a PCF, and may include but is not limited to the following steps.

Step S601: The UE determines a second encapsulation identifier corresponding to an Ethernet session.

The UE may autonomously allocate the second encapsulation identifier to the Ethernet session, or may obtain the second encapsulation identifier corresponding to the Ethernet session from a URSP. Alternatively, if the UE cannot obtain the second encapsulation identifier from the URSP, the UE allocates the second encapsulation identifier to the Ethernet session.

Step S602: The UE sends a session management request message to the AMF, where the session management request message includes the second encapsulation identifier. Correspondingly, the AMF receives the session management request message from the UE.

The session management request message may be a session establishment request message, or a session modification request message. The session management request message may include a session identifier of the Ethernet session.

In a possible implementation, the session management request message may further include an application program identifier or linked-device information, where the application program identifier or the linked-device information is an identifier of an application program triggering the UE to establish or modify the Ethernet session or information about a linked device triggering the UE to establish or modify the Ethernet session. It may be understood that the UE requests to establish or modify the Ethernet session corresponding to the application program identifier or the linked-device information, where the Ethernet session is bound to the application program identifier or the linked-device information. For example, the UE requests to establish an Ethernet session corresponding to an APP 1, where the session management request message carries an application program identifier of the APP 1.

Alternatively, the application program identifier or the linked-device information may be sent together with the second encapsulation identifier, to be specific, the application program identifier or the linked-device information and the second encapsulation identifier are jointly carried in the session management request message; or may be sent independent of the second encapsulation identifier.

In a possible implementation, the session management request message may further include a data network local area network identifier. The data network local area network identifier is used to identify an identifier of a local area network to which the terminal device belongs in a data network. The data network local area network identifier is bound to the Ethernet session, so that the UPF may send an uplink data packet of the Ethernet session to the corresponding data network based on the data network local area network identifier corresponding to the Ethernet session.

Alternatively, the data network local area network identifier may be sent together with the second encapsulation identifier, in other words, the data network local area network identifier and the second encapsulation identifier are jointly carried in the session management request message; or may be sent independent of the second encapsulation identifier.

In a possible implementation, the session management request message may further include a 5G local area network identifier. The 5G local area network identifier may be determined by the UE based on local configuration information or obtained from the URSP, and is used to indicate a 5G LAN to which the Ethernet session of the UE belongs, and indicate that the Ethernet session is established for the 5G LAN and belongs to the 5G LAN group.

Alternatively, the 5G local area network identifier may be sent together with the second encapsulation identifier, in other words, the 5G local area network identifier and the second encapsulation identifier are jointly carried in the session management request message; or may be sent independent of the second encapsulation identifier.

In a possible implementation, the session management request message further includes the session identifier of the Ethernet session, so that the AMF learns of the Ethernet session to which a first encapsulation identifier is bound.

Step S603: The AMF sends the session management request message to the SMF, where the session management request message includes the second encapsulation identifier. Correspondingly, the SMF receives the session management request message from the AMF.

Actually, in step S602 and step S603, the UE sends the session management request message to the SMF by using the AMF.

Step S604: The SMF determines the first encapsulation identifier of the Ethernet session.

In a possible implementation, the SMF directly determines the second encapsulation identifier sent by the UE as the first encapsulation identifier of the Ethernet session.

In a possible implementation, when the SMF receives the second encapsulation identifier from the UE, the SMF determines whether the second encapsulation identifier is available. If the second encapsulation identifier is available, the SMF determines the second encapsulation identifier as the first encapsulation identifier of the Ethernet session. If the second encapsulation identifier is not available, the SMF may send a message to the UE, where the message may instruct the UE to redetermine and report a second encapsulation identifier; or the SMF rejects establishment or modification of the Ethernet session and indicates a rejection cause, and the UE may redetermine a second encapsulation identifier based on the rejection cause and resend a session management request message to the SMF to request to establish or modify the Ethernet session; or the SMF autonomously determines an encapsulation identifier for the Ethernet session, and uses the encapsulation identifier as the first encapsulation identifier corresponding to the Ethernet session.

Step S605: The SMF sends a policy control message to the PCF, where the policy control message includes the first encapsulation identifier. Correspondingly, the PCF receives the policy control message from the SMF.

The policy control message may be an Npcf_SMPolicy-Control_Create Request message, or an Npcf_SMPolicy-Control_Update Request message.

In a possible implementation, the policy control message may further include the application program identifier or the linked-device information, where the application program identifier or the linked-device information is the identifier of the application program triggering the UE to establish or modify the Ethernet session or the information about the linked device triggering the UE to establish or modify the Ethernet session.

In a possible implementation, the policy control message may further include the data network local area network identifier.

In a possible implementation, the policy control message may further include the 5G local area network identifier.

In a possible implementation, the policy control message further includes the session identifier of the Ethernet session, so that the PCF learns of the Ethernet session to which the first encapsulation identifier is bound.

After step S605, the communication method may further include step S605a to step S605c.

Step S605a: The PCF determines whether to update the URSP on the UE.

When receiving the policy control message, the PCF determines whether to update the URSP on the UE.

If the URSP on the UE does not include the first encapsulation identifier, the PCF adds the first encapsulation identifier to the URSP to update the URSP, to be specific, adds a correspondence between the application program identifier or the linked-device information and the first encapsulation identifier to the URSP. For example, the correspondence between the application program identifier and the first encapsulation identifier is added to Table 1, that is, a row is added to Table 1, and a corresponding 5G LAN ID may be further added to Table 1. If an encapsulation identifier that corresponds to the application program identifier and that is included in the URSP on the UE is different from that in step S605, the PCF updates the URSP on the UE by using the first encapsulation identifier included in step S605, for example, updates the encapsulation identifier corresponding to the application program identifier in Table 1.

Step S605b: If a determining result is yes, the PCF sends a policy control update notification to the AMF, where the policy control update notification includes an updated URSP. Correspondingly, the AMF receives the policy control update notification from the PCF.

If the determining result is yes, the PCF may choose, based on a local policy configured by an operator, whether to send the policy control update notification to the AMF. If the local policy configured by the operator is recommending the PCF to update the URSP in real time, the PCF sends the policy control update notification to the AMF. If the local policy configured by the operator is prohibiting the PCF from updating the URSP, the PCF does not send the policy control update notification to the AMF.

The policy control update notification may be a pcf_AMPolicyControl_UpdateNotification.

The policy control update notification may further include the session identifier of the Ethernet session.

Step S605c: The AMF sends an update message to the UE, where the update message reports the updated URSP. Correspondingly, the UE receives the update message from the AMF.

The update message may be a non-access stratum (NAS) transport message. The update message further includes the session identifier of the Ethernet session.

When receiving the update message, the UE updates the URSP.

Step S606: The SMF sends an N4 message to the UPF, where the N4 message includes the first encapsulation identifier. Correspondingly, the UPF receives the N4 message from the SMF The N4 message may further include the data network local area network identifier, so that the UPF may process the uplink data packet of the Ethernet session based on the data network local area network identifier corresponding to the Ethernet session, and send the uplink data packet of the Ethernet session to the corresponding data network local area network.

Step S607: The SMF sends a session management response message to the AMF. Correspondingly, the AMF receives the session management response message from the SMF.

Step S608: The AMF sends the session management response message to the UE. Correspondingly, the UE receives the session management response message from the AMF.

Actually, in step S607 and step S608, the SMF sends the session management response message to the UE by using the AMF. The session management response message may be used to respond to the session management request message, or may be used to notify the UE of the encapsulation identifier bound to the Ethernet session, that is, the first encapsulation identifier.

It should be noted that a sequence of performing step S606 and step S607 is not limited in this embodiment of this application. Step S606 and step S607 may be performed at the same time, or step S606 may be performed before step S607, or step S607 may be performed before step S606.

Step S609: The UE encapsulates the uplink data packet based on the first encapsulation identifier.

The uplink data packet is the data packet corresponding to the application program or the linked device triggering establishment or modification of the Ethernet session.

Step S610: The UE sends the encapsulated uplink data packet by using the Ethernet session.

For specific implementation processes of step S609 and step S610, refer to detailed description of step S402 and step S403 in the embodiment shown in FIG. 4. Details are not described herein again.

Step S611: When receiving the data packet corresponding to the Ethernet session, the UPF processes the data packet.

The UPF may learn of, by using the N4 message, the first encapsulation identifier and the data network local area network identifier that are bound to the Ethernet session. In this way, when receiving the data packet corresponding to the Ethernet session, the UPF may perform packet header encapsulation processing on the data packet.

For an uplink data packet, the UPF deletes, from the uplink data packet, the first encapsulation identifier of the Ethernet session that is carried in the uplink data packet, or replaces the first encapsulation identifier of the Ethernet session that is carried in the uplink data packet with the data network local area network identifier.

For a downlink data packet, the UPF replaces the data network local area network identifier carried in the downlink data packet with the first encapsulation identifier of the Ethernet session, or adds the first encapsulation identifier of the Ethernet session to the downlink data packet. Even though the downlink data packet carries the data network local area network identifier, this embodiment of this application is not affected, because the data network local area network identifier is valid only in the data network.

If the UPF receives a data packet on a 5G LAN session, during forwarding, the UPF may forward the data packet among Ethernet sessions having a same encapsulation identifier.

If establishment or modification of the Ethernet session is completed and the UPF first receives the downlink data packet corresponding to the Ethernet session, step S611 may be performed before step S609 and step S610.

In the embodiment shown in FIG. 6, the SMF determines the first encapsulation identifier bound to the Ethernet session, so that different Ethernet sessions may be distinguished by using different bound encapsulation identifiers, and further, it can be ensured that data is transmitted by using a correct Ethernet session.

Figure 7:
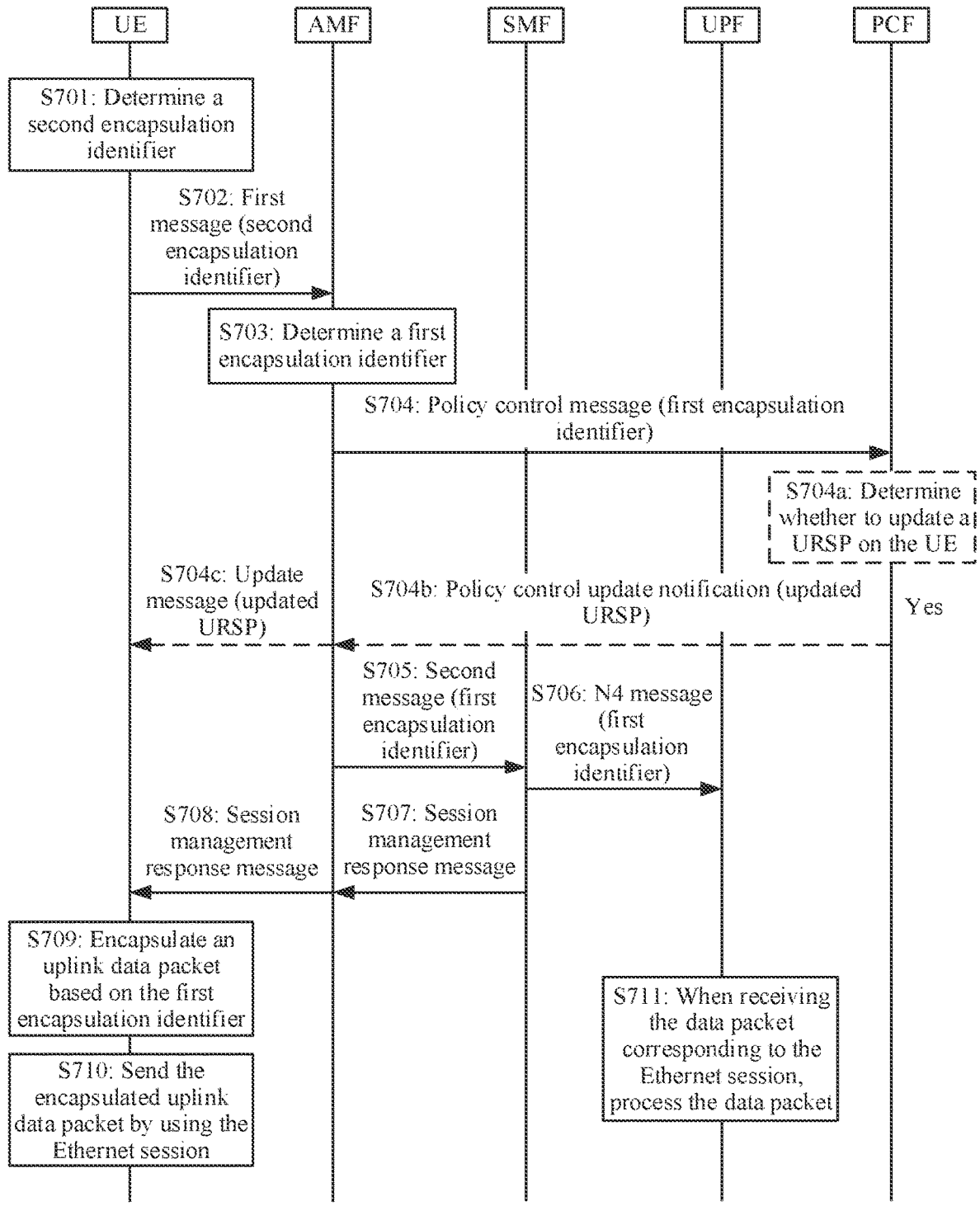
FIG. 7 is a schematic flowchart of a communication method according to Embodiment 4 of this application.

FIG. 7 is a schematic flowchart of a communication method according to Embodiment 4 of this application. Embodiment 4 is described from a perspective of interaction among UE, an AMF, an SMF, a UPF, and a PCF, and may include but is not limited to the following steps.

Step S701: The UE determines a second encapsulation identifier corresponding to an Ethernet session.

For a specific implementation process of step S701, refer to the specific description of step S601 in the embodiment shown in FIG. 6. Details are not described herein again.

Step S702: The UE sends a first message to the AMF, where the first message includes the second encapsulation identifier. Correspondingly, the AMF receives the first message from the UE.

The first message may be an NAS message.

In a possible implementation, the first message may further include an application program identifier or linked-device information, where the application program identifier or the linked-device information is an identifier of an application program triggering the UE to establish or modify the Ethernet session or information about a linked device triggering the UE to establish or modify the Ethernet session. It may be understood that the UE requests to establish or modify the Ethernet session corresponding to the application program identifier or the linked-device information, where the Ethernet session is bound to the application program identifier or the linked-device information. For example, the UE requests to establish an Ethernet session corresponding to an APP 1, where a session management request message carries an application identifier of the APP 1.

Alternatively, the application program identifier or the linked-device information may be sent together with the second encapsulation identifier, to be specific, the application program identifier or the linked-device information and the second encapsulation identifier are jointly carried in the first message; or may be sent independent of the second encapsulation identifier.

In a possible implementation, the first message may further include a 5G local area network identifier. The 5G local area network identifier may be determined by the UE based on local configuration information or obtained from a URSP, and is used to indicate a 5G LAN to which the Ethernet session of the UE belongs, and indicate that the Ethernet session is established for the 5G LAN and belongs to the 5G LAN group.

Alternatively, the 5G local area network identifier may be sent together with the second encapsulation identifier, to be specific, the 5G local area network identifier and the second encapsulation identifier are jointly carried in the first message; or may be sent independent of the second encapsulation identifier.

In a possible implementation, the first message further includes a session identifier of the Ethernet session, so that the AMF learns of the Ethernet session to which a first encapsulation identifier is bound.

In a possible implementation, the first message further includes a session management request message, where the session management request message includes a data network local area network identifier.

Step 703: The AMF determines the first encapsulation identifier of the Ethernet session.

In a possible implementation, the AMF directly determines the second encapsulation identifier sent by the UE as the first encapsulation identifier of the Ethernet session.

In a possible implementation, when the AMF receives the second encapsulation identifier from the UE, the AMF determines whether the second encapsulation identifier is available. If the second encapsulation identifier is available, the AMF determines the second encapsulation identifier as the first encapsulation identifier of the Ethernet session. If the second encapsulation identifier is not available, the AMF may send a message to the UE, where the message may instruct the UE to redetermine and report a second encapsulation identifier; or the AMF rejects establishment or modification of the Ethernet session and indicates a rejection cause and the UE may redetermine a second encapsulation identifier based on the rejection cause and resend a session management request message to the AMF to request to establish or modify the Ethernet session; or the AMF autonomously determines an encapsulation identifier for the Ethernet session, and uses the encapsulation identifier as the first encapsulation identifier corresponding to the Ethernet session.

Step S704: The AMF sends a policy control message to the PCF, where the policy control message includes the first encapsulation identifier. Correspondingly, the PCF receives the policy control message from the AMF.

The policy control message may be an Npcf_AMPolicy-Control_Create message.

In a possible implementation, the policy control message may further include the application program identifier or the linked-device information, where the application program identifier or the linked-device information is the identifier of the application program triggering the UE to establish or modify the Ethernet session or the information about the linked device triggering the UE to establish or modify the Ethernet session.

In a possible implementation, the policy control message may further include the data network local area network identifier.

In a possible implementation, the policy control message may further include the 5G local area network identifier.

In a possible implementation, the policy control message further includes the session identifier of the Ethernet session, so that the PCF learns of the Ethernet session to which the first encapsulation identifier is bound.

After step S704, the communication method may further include step S704a to step S704c. For a specific implementation process of step S704a to step S704c, refer to the specific description of step S605a to step S605c in the embodiment shown in FIG. 6. Details are not described herein again.

Step S704a: The PCF determines whether to update the URSP on the UE.

Step S704b: If a determining result is yes, the PCF sends a policy control update notification to the AMF, where the policy control update notification includes an updated URSP. Correspondingly, the AMF receives the policy control update notification from the PCF.

Step S704c: The AMF sends an update message to the UE, where the update message reports the updated URSP. Correspondingly, the UE receives the update message from the AMF.

Step S705: The AMF sends a second message to the SMF, where the second message includes the first encapsulation identifier of the Ethernet session. Correspondingly, the SMF receives the second message from the AMF.

The second message may be an Nsmf_PDUSession_CreateSMContext message or an Nsmf_PDUSession_UpdateSMContext message.

In a possible implementation, the second message further includes the session management request message, where the session management request message includes the data network local area network identifier.

In a possible implementation, the second message may further include the session identifier of the Ethernet session.

Step S706: The SMF sends an N4 message to the UPF, where the N4 message includes the first encapsulation identifier. Correspondingly, the UPF receives the N4 message from the SMF.

Step S707: The SMF sends a session management response message to the AMF. Correspondingly, the AMF receives the session management response message from the SMF.

Step S708: The AMF sends the session management response message to the UE. Correspondingly, the UE receives the session management response message from the AMF.

Step S709: The UE encapsulates an uplink data packet based on the first encapsulation identifier.

Step S710: The UE sends the encapsulated uplink data packet by using the Ethernet session.

Step S711: When receiving the data packet corresponding to the Ethernet session, the UPF processes the data packet.

For a specific implementation process of step S706 to step S711, refer to the specific description of step S606 to step S611 in the embodiment shown in FIG. 6. Details are not described herein again.

In the embodiment shown in FIG. 7, the AMF determines the first encapsulation identifier bound to the Ethernet session, so that different Ethernet sessions may be distinguished by using different bound encapsulation identifiers, and further, it can be ensured that data is transmitted by using a correct Ethernet session.

Figure 8:
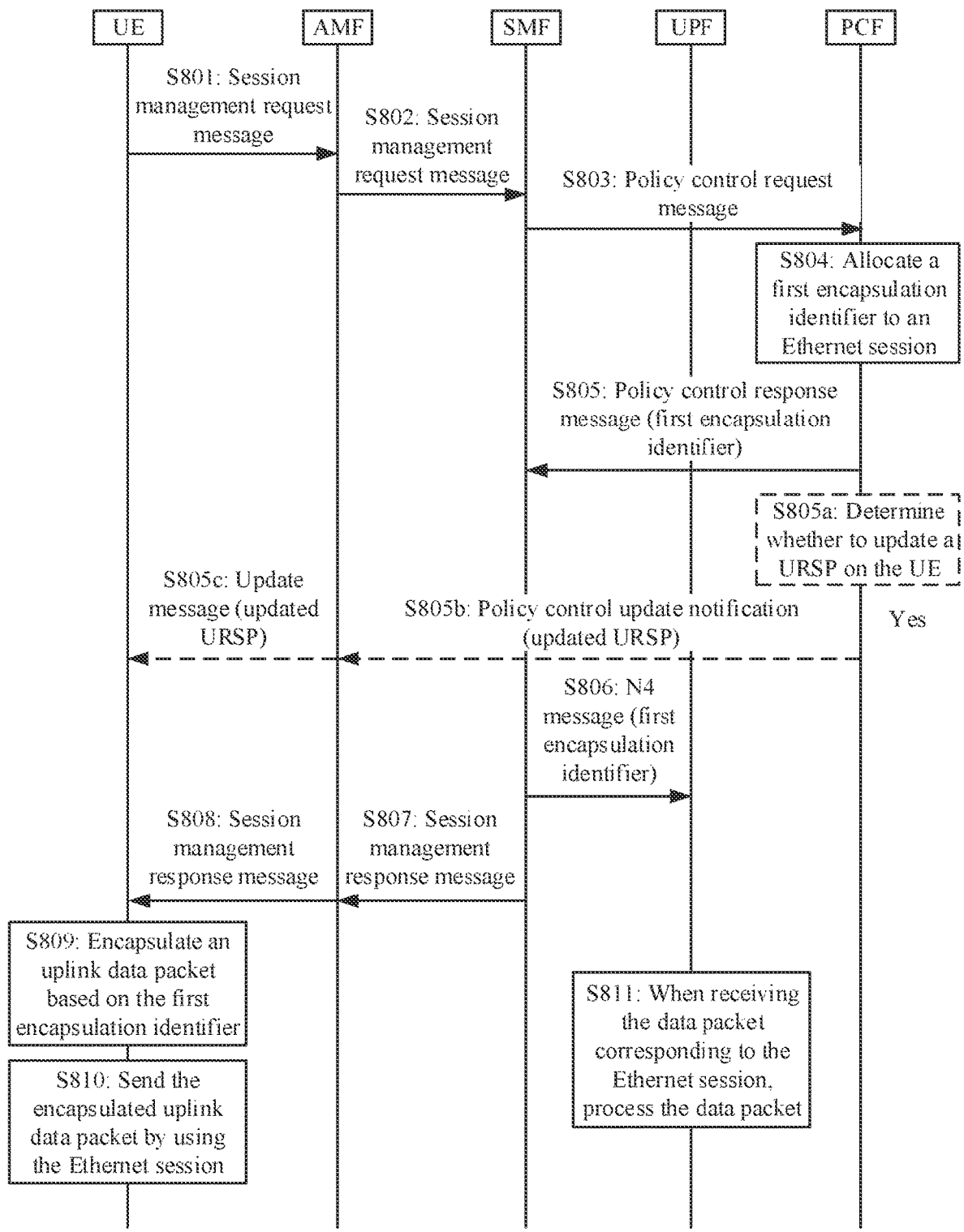
FIG. 8 is a schematic flowchart of a communication method according to Embodiment 5 of this application.

FIG. 8 is a schematic flowchart of a communication method according to Embodiment 5 of this application. Embodiment 5 is described from a perspective of interaction among UE, an AMF, an SMF, a UPF, and a PCF. For a part in Embodiment 5 that is the same as that in the embodiment shown in FIG. 6, refer to specific description of a corresponding part in FIG. 6. The embodiment shown in FIG. 8 may include but is not limited to the following steps.

Step S801: The UE sends a session management request message to the AMF. Correspondingly, the AMF receives the session management request message from the UE.

Step S802: The AMF sends the session management request message to the SMF. Correspondingly, the SMF receives the session management request message from the AMF.

The session management request message may include a session identifier of an Ethernet session, or may include an application program identifier or linked-device information, or may include a data network local area network identifier, or may include a 5G local area network identifier.

Step S803: The SMF sends a policy control request message to the PCF. Correspondingly, the PCF receives the policy control request message from the SMF.

The policy control request message in step S803 may be an Npcf_SMPolicyControl__Create Request message, or an Npcf_SMPolicyControl_Update Request message. The policy control request information may include the session identifier of the Ethernet session, or may include the application identifier or the linked-device information, or may include the data network local area network identifier, or may include the 5G local area network identifier.

Step S804: The PCF allocates a first encapsulation identifier to the Ethernet session.

Step S805: The PCF sends a policy control response message to the SMF, where the policy control response message includes the first encapsulation identifier. Correspondingly, the SMF receives the policy control response message from the PCF.

The policy control response message in step S805 may be an Npcf_SMPolicyControl__Create Response message, or an Npcf_SMPolicyControl_Update Response message. The policy control response message may further include the session identifier of the Ethernet session.

After step S805, the communication method may further include step S805a to step S805c.

Step S805a: The PCF determines whether to update a URSP on the UE.

Step S805b: If a determining result is yes, the PCF sends a policy control update notification to the AMF, where the policy control update notification includes an updated URSP. Correspondingly, the AMF receives the policy control update notification from the PCF.

Step S805c: The AMF sends an update message to the UE, where the update message reports the updated URSP. Correspondingly, the UE receives the update message from the AMF.

Step S806: The SMF sends an N4 message to the UPF, where the N4 message includes the first encapsulation identifier. Correspondingly, the UPF receives the N4 message from the SMF.

Step S807: The SMF sends a session management response message to the AMF. Correspondingly, the AMF receives the session management response message from the SMF.

Step S808: The AMF sends the session management response message to the UE. Correspondingly, the UE receives the session management response message from the AMF.

Step S809: The UE encapsulates an uplink data packet based on the first encapsulation identifier.

Step S810: The UE sends the encapsulated uplink data packet by using the Ethernet session.

Step S811: When receiving the data packet corresponding to the Ethernet session, the UPF processes the data packet.

In the embodiment shown in FIG. 8, the PCF allocates the first encapsulation identifier bound to the Ethernet session, so that different Ethernet sessions may be distinguished by using different bound encapsulation identifiers, and further, it can be ensured that data is transmitted by using a correct Ethernet session.

Figure 9:
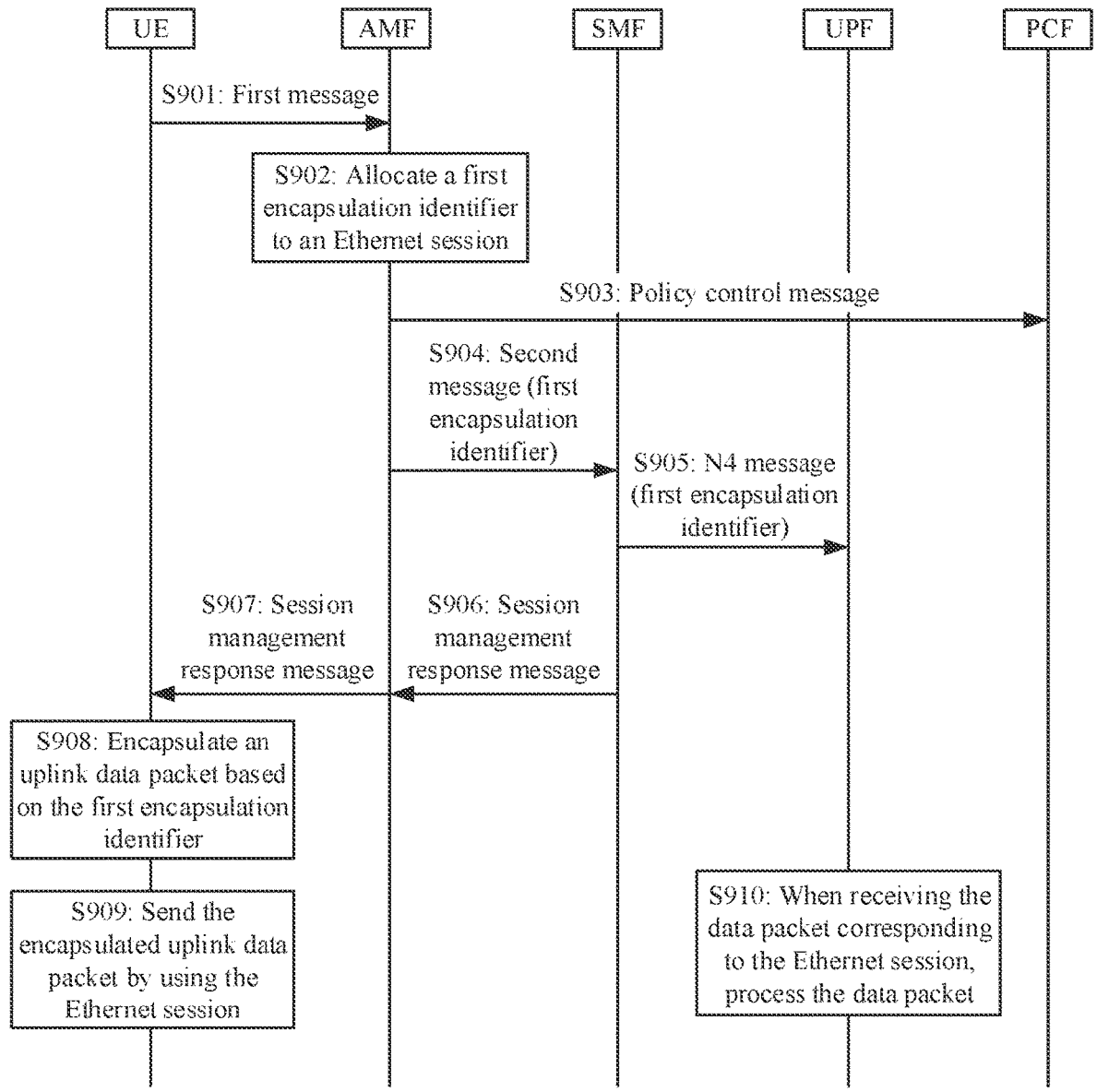
FIG. 9 is a schematic flowchart of a communication method according to Embodiment 6 of this application.

FIG. 9 is a schematic flowchart of a communication method according to Embodiment 6 of this application. Embodiment 6 is described from a perspective of interaction among UE, an AMF, an SMF, a UPF, and a PCF. For a part in Embodiment 6 that is the same as that in the embodiment shown in FIG. 7, refer to specific description of a corresponding part in FIG. 7. The embodiment shown in FIG. 9 may include but is not limited to the following steps.

Step S901: The UE sends a first message to the AMF. Correspondingly, the AMF receives the first message from the UE.

The first message may be an NAS message. The first message may include an application program identifier or linked-device information, or may include a 5G local area network identifier, or may include a session management request message. The session management request message includes a data network local area network identifier, and the session management request message is used to request to establish or modify an Ethernet session. The first message may further include a session identifier of the Ethernet session.

Step S902: The AMF allocates a first encapsulation identifier to the Ethernet session.

Step S903: The AMF sends a policy control message to the PCF. Correspondingly, the PCF receives the policy control message from the AMF.

The policy control information may be an Npcf_AMPolicyControl_Create message, or an Npcf_AMPolicyControl_Update message.

The policy control information may include the first encapsulation identifier, or may include the session identifier of the Ethernet session, or may include the application identifier or the linked information, or may include the data network local area network identifier, or may include the 5G local area network identifier.

If the AMF does not allocate the encapsulation identifier to the Ethernet session, the policy control information does not include the first encapsulation identifier and step S804 in the embodiment shown in FIG. 8 may be performed. The PCF allocates an encapsulation identifier to the Ethernet session, and the PCF notifies the AMF of the encapsulation identifier allocated by the PCF.

If the AMF allocates the encapsulation identifier to the Ethernet session, the policy control information includes the first encapsulation identifier and step S904 may be performed.

The PCF may determine whether to update a URSP on the UE. If a determining result is yes, the PCF sends a policy control update notification to the AMF, where the policy control update notification includes an updated URSP. Correspondingly, the AMF receives the policy control update notification from the PCF. The AMF sends an update message to the UE, where the update message reports the updated URSP. Correspondingly, the UE receives the update message from the AMF.

Step S904: The AMF sends a second message to the SMF, where the second message includes the first encapsulation identifier of the Ethernet session. Correspondingly, the SMF receives the second message from the AMF.

The second message may be Nsmf_PDUSession_CreateSMContext, or Nsmf_PDUSession_UpdateSMContext.

In a possible implementation, the second message further includes the session management request message, where the session management request message includes the data network local area network identifier.

In a possible implementation, the second message may further include the session identifier of the Ethernet session.

Step S905: The SMF sends an N4 message to the UPF, where the N4 message includes the first encapsulation identifier. Correspondingly, the UPF receives the N4 message from the SMF.

Step S906: The SMF sends a session management response message to the AMF. Correspondingly, the AMF receives the session management response message from the SMF.

Step S907: The AMF sends the session management response message to the UE. Correspondingly, the UE receives the session management response message from the AMF.

Step S908: The UE encapsulates an uplink data packet based on the first encapsulation identifier.

Step S909: The UE sends the encapsulated uplink data packet by using the Ethernet session.

Step S910: When receiving the data packet corresponding to the Ethernet session, the UPF processes the data packet.

In the embodiment shown in FIG. 9, the AMF allocates the first encapsulation identifier bound to the Ethernet session, so that different Ethernet sessions may be distinguished by using different bound encapsulation identifiers, and further, it can be ensured that data is transmitted by using a correct Ethernet session.

Figure 10:
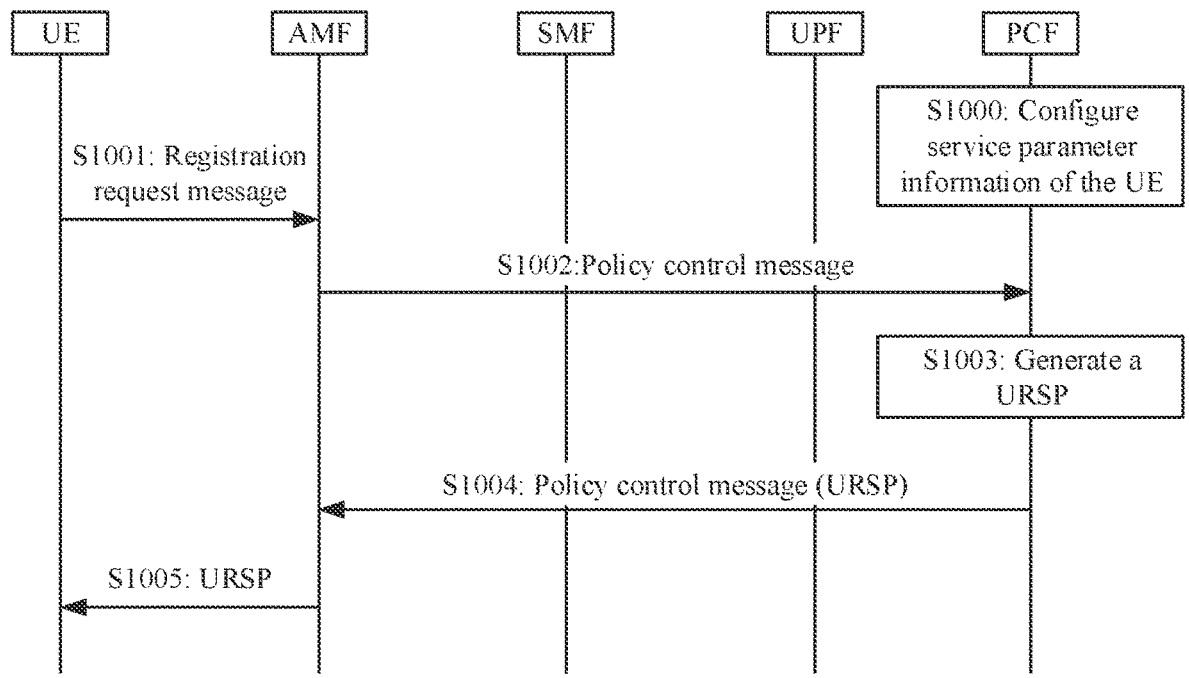
FIG. 10 is a schematic flowchart of a communication method according to Embodiment 7 of this application.

FIG. 10 is a schematic flowchart of a communication method according to Embodiment 7 of this application. Embodiment 7 is described from a perspective of interaction among UE, an AMF, an SMF, a UPF, and a PCF, and may include but is not limited to the following steps.

Step S1000: The PCF configures service parameter information of the UE.

The service parameter information may include information such as an identifier of the UE, an application program identifier, or a 5G local area network identifier.

Step S1001: The UE sends a registration request message to the AMF. Correspondingly, the AMF receives the registration request message from the UE.

The registration request message includes the application program identifier or linked-device information.

In a possible implementation, the application identifier may be an application identifier of each application program installed on the UE, and the linked-device information may be information about each device that establishes a link on the UE.

Step S1002: The AMF sends a policy control message to the PCF. Correspondingly, the PCF receives the policy control message from the AMF.

The policy control message in step S1002 may be an Npcf_AMPolicyControl_Create message, or an Npcf_AMPolicyControl_Update message. The policy control message includes information carried in the registration request message.

Step S1003: The PCF generates a URSP.

The PCF may generate the URSP based on the information configured in step S1000, or generate the URSP based on the information carried in step S1002.

The URSP may include the application program identifier or the linked-device information, and an encapsulation identifier corresponding to the application program identifier or the linked-device information, to be specific, include a correspondence between the application program identifier or the linked-device information and the encapsulation identifier. The URSP may further include the 5G local area network identifier.

Step S1004: The PCF sends a policy control message to the AMF. Correspondingly, the AMF receives the policy control message sent by the PCF.

The policy control message in step S1004 may be Npcf_AMPolicyControl_Create Response, or Npcf_AM-PolicyControl_Update Response, or Npcf_AMPolicyControl_UpdateNotification. The policy control message includes the URSP.

Step S1005: The AMF sends the URSP to the UE. Correspondingly, the UE receives the URSP from the AMF.

The AMF may send the URSP to the UE by using an NAS transport message.

When the UE receives the URSP, when establishing or modifying an Ethernet session, the UE may determine, based on the URSP, an encapsulation identifier corresponding to an application program triggering establishment or modification of the Ethernet session. Because there is a correspondence between the application program and the Ethernet session, the encapsulation identifier corresponding to the Ethernet session may be determined, in other words, the encapsulation identifier corresponding to the application program. The UE may further obtain the 5G local area network identifier from the URSP.

It may be understood that, in the embodiment shown in FIG. 10, before the UE establishes or modifies the Ethernet session, the PCF dynamically configures the URSP on the UE; and when establishing or modifying the Ethernet session, the UE may determine, based on the URSP, the encapsulation identifier corresponding to the Ethernet session or the 5G local area network identifier.

The method according to the embodiments of this application is described above in detail, and an apparatus according to the embodiments of this application is described below.

Figure 11:
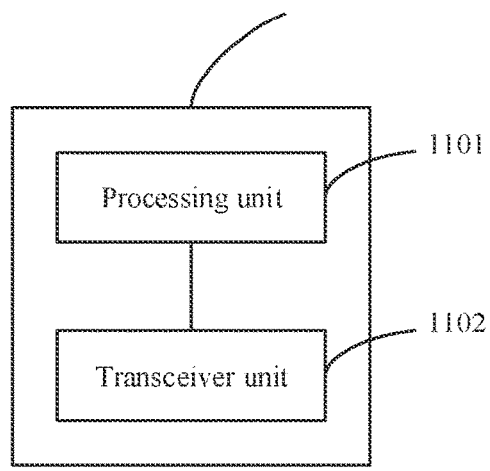
FIG. 11 is a schematic logical structure diagram of a communications apparatus according to an embodiment of this application.

FIG. 11 is a schematic diagram of a logical structure of a communications apparatus according to an embodiment of this application. The communications apparatus 110 may include a processing unit 1101 and a transceiver unit 1102.

The communications apparatus 110 may be the control plane network element 101 shown in FIG. 1, or the terminal device 100 shown in FIG. 1.

In a possible implementation, if the communications apparatus 110 is the control plane network element 101 shown in FIG. 1, the processing unit 1101 is configured to determine a first encapsulation identifier corresponding to an Ethernet session. The transceiver unit 1102 is configured to send the first encapsulation identifier corresponding to the Ethernet session to a user plane network element, where the first encapsulation identifier is used to instruct the user plane network element to process a data packet corresponding to the Ethernet session based on the first encapsulation identifier. Alternatively, the communications apparatus 110 may be the SMF in the embodiments shown in FIG. 6 to FIG. 9. The processing unit 1101 is configured to perform step S604 in the embodiment shown in FIG. 6. The transceiver unit 1102 is configured to perform step S603, step S605, step S606, and step S607 in the embodiment shown in FIG. 6, perform step S705, step S706, and step S707 in the embodiment shown in FIG. 7, perform step S802, step S803, step S805, step S806, and step S807 in the embodiment shown in FIG. 8, and perform step S904, step S905, and step S906 in the embodiment shown in FIG. 9.

The communications apparatus 110 may implement functions of the SMF in the foregoing method embodiments. For detailed execution processes of units in the communications apparatus 110, refer to execution steps of the SMF in the foregoing method embodiments. Details are not described herein again.

In a possible implementation, if the communications apparatus 110 is the terminal device 100 shown in FIG. 1, the processing unit 1101 is configured to determine a first encapsulation identifier corresponding to an Ethernet session, and encapsulate an uplink data packet based on the first encapsulation identifier, where the uplink data packet is a data packet triggered by an application program bound to the Ethernet session. The transceiver unit 1102 is configured to map, based on the first encapsulation identifier, the encapsulated data packet to the Ethernet session for transmission. Alternatively, the communications apparatus 110 may be the UE in the embodiments shown in FIG. 6 to FIG. 10. The processing unit 1101 is configured to perform step S601 and step S609 in the embodiment shown in FIG. 6, perform step S701 and step S709 in the embodiment shown in FIG. 7, perform step S809 in the embodiment shown in FIG. 8, and perform step S908 in the embodiment shown in FIG. 9. The transceiver unit 1102 is configured to perform step S601, step S602, step S605c, step S608, and step S610 in the embodiment shown in FIG. 6, perform step S702, step S704c, step S708, and step S710 in the embodiment shown in FIG. 7, perform step S801, step S805c, step S808, and step S810 in the embodiment shown in FIG. 8, perform step S901, step S907, and step S909 in the embodiment shown in FIG. 9, and perform step S1001 and step S1005 in the embodiment shown in FIG. 10.

The communications apparatus 110 may implement functions of the UE in the foregoing method embodiments. For detailed execution processes of units in the communications apparatus 110, refer to execution steps of the UE in the foregoing method embodiments. Details are not described herein again.

Figure 12:
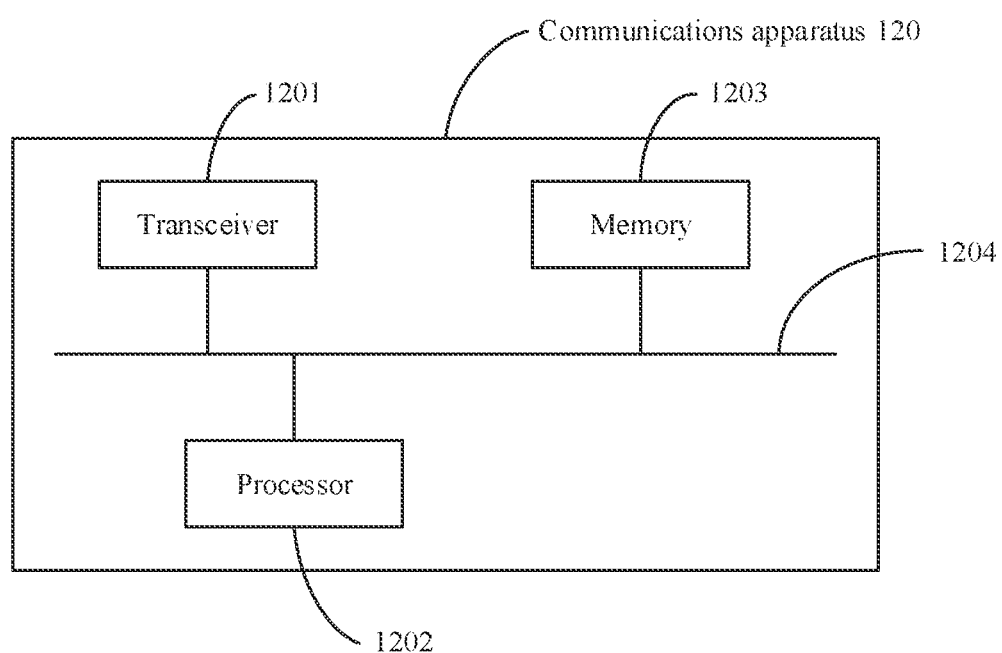
FIG. 12 is a simplified schematic diagram of a physical structure of a communications apparatus according to an embodiment of this application.

FIG. 12 is a simplified schematic diagram of a physical structure of a communications apparatus according to an embodiment of this application. The communications apparatus 120 may be the control plane network element 101 shown in FIG. 1, or the terminal device 100 shown in FIG. 1. The communications apparatus 120 includes a transceiver 1201, a processor 1202, and a memory 1203. The transceiver 1201, the processor 1202, and the memory 1203 may be connected to each other by using a bus 1204, or may be connected to each other in another manner. A related function implemented by the processing unit 1101 shown in FIG. 11 may be implemented by using one or more processors 1202. A related function implemented by the transceiver unit 1102 shown in FIG. 11 may be implemented by the transceiver 1201.

The memory 1203 includes but is not limited to a random access memory (RAM), a read-only memory (ROM), an erasable programmable read only memory (EPROM), or a compact disc read-only memory (CD-ROM). The memory 1203 is configured to store a related instruction and related data.

The transceiver 1201 is configured to send data and/or signaling, and receive data and/or signaling.

If the communications apparatus 120 is the SMF in the embodiments shown in FIG. 6 to FIG. 9, the transceiver 1201 may be configured to communicate with the AMF, the UPF, and the PCF, for example, perform step S603, step S605, step S606, and step S607 in the embodiment shown in FIG. 6, perform step S705, step S706, and step S707 in the embodiment shown in FIG. 7, perform step S802, step S803, step S805, step S806, and step S807 in the embodiment shown in FIG. 8, and perform step S904, step S905, and step S906 in the embodiment shown in FIG. 9.

If the communications apparatus 120 is the UE in the embodiments shown in FIG. 6 to FIG. 10, the transceiver 1201 may be configured to communicate with the AMF, for example, perform step S601, step S602, step S605c, step S608, and step S610 in the embodiment shown in FIG. 6, perform step S702, step S704c, step S708, and step S710 in the embodiment shown in FIG. 7, perform step S801, step S805c, step S808, and step S810 in the embodiment shown in FIG. 8, perform step S901, step S907, and step S909 in the embodiment shown in FIG. 9, and perform step S1001 and step S1005 in the embodiment shown in FIG. 10.

The processor 1202 may include one or more processors, for example, include one or more central processing units (CPU). When the processor 1202 is one CPU, the CPU may be a single-core CPU or a multi-core CPU.

If the communications apparatus 120 is the SMF in the embodiments shown in FIG. 6 to FIG. 9, the processor 1202 may be configured to perform an operation of controlling the SMF, for example, perform step S604 in the embodiment shown in FIG. 6.

If the communications apparatus 120 is the UE in the embodiments shown in FIG. 6 to FIG. 10, the processor 1202 may be configured to perform an operation of controlling the UE, for example, perform step S601 and step S609 in the embodiment shown in FIG. 6, perform step S701 and step S709 in the embodiment shown in FIG. 7, perform step S809 in the embodiment shown in FIG. 8, and perform step S908 in the embodiment shown in FIG. 9.

The memory 1203 is configured to store program code and data of the communications apparatus 120.

For details of the steps performed by the processor 1202 and the transceiver 1201, refer to the specific description in the embodiments shown in FIG. 6 to FIG. 10. Details are not described herein again.

It may be understood that FIG. 12 only shows a simplified design of the communications apparatus. In an actual application, the communications apparatus may further include other necessary components, including but not limited to any quantity of transceivers, processors, controllers, memories, or communications units. All devices capable of implementing this application fall within the protection scope of this application.

An embodiment of this application further provides a communications system. The communications system may include a control plane network element and a terminal device, and may further include a user plane network element, an access management network element, and a policy management network element.

A person of ordinary skill in the art may understand that all or some of the processes of the methods in the embodiments may be implemented by a computer program instructing relevant hardware. The program may be stored in a computer-readable storage medium. When the program is run, the processes of the methods in the embodiments may be performed. The foregoing storage medium includes: any medium that can store program code, such as a ROM, a random access memory RAM, a magnetic disk, or an optical disc. Therefore, another embodiment of this application provides a computer-readable storage medium, where the computer-readable storage medium stores an instruction, and when the instruction is run on a computer, the computer is enabled to perform the methods in the foregoing aspects.

Another embodiment of this application further provides a computer program product including an instruction. When the computer program product is run on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instruction may be transmitted from one website, one computer, one server, or one data center to another website, another computer, another server, or another data center in a wired manner (for example, a coaxial cable, an optical fiber, or a digital subscriber line (DSL)) or a wireless manner (for example, infrared, radio, or a microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method used to transmit an uplink data packet of an apparatus by using an Ethernet session, wherein the communication method comprises:
    after determining that the Ethernet session needs to be established or modified, matching, by the apparatus, an identifier of an application program with a user equipment route selection policy (URSP), wherein the application program is an application program triggering establishment or modification of the Ethernet session, and wherein the URSP comprises a correspondence between an encapsulation identifier and the identifier of the application program;
    in response to a determination that the identifier of application program exists in the URSP, obtaining, by the apparatus, the encapsulation identifier based on the correspondence;
    determining, by the apparatus, the encapsulation identifier as a first encapsulation identifier corresponding to the Ethernet session;
    encapsulating, by the apparatus, the uplink data packet based on the first encapsulation identifier and a media access control (MAC) address of the apparatus to generate an encapsulated data packet, wherein the uplink data packet is a data packet triggered by an application program bound to the Ethernet session; and
    mapping, by the apparatus based on the first encapsulation identifier, the encapsulated data packet to the Ethernet session for transmission.

2. The method according to claim 1, wherein the mapping, by the apparatus based on the first encapsulation identifier, the encapsulated data packet to the Ethernet session for transmission comprises:
    mapping, by the apparatus based on a correspondence between the first encapsulation identifier and the Ethernet session, the encapsulated data packet to the Ethernet session for transmission.

3. The method according to claim 1, wherein before the determining the first encapsulation identifier corresponding to the Ethernet session, the method further comprises:
    allocating, by the apparatus, a second encapsulation identifier to the Ethernet session in a process of establishing or modifying the Ethernet session; and
    wherein the determining the first encapsulation identifier corresponding to the Ethernet session comprises:
        determining, by the apparatus, the second encapsulation identifier as the first encapsulation identifier corresponding to the Ethernet session.

4. The method according to claim 1, wherein before the determining the first encapsulation identifier corresponding to the Ethernet session, the method further comprises:
    in a process of establishing or modifying the Ethernet session, receiving, by the apparatus, a third encapsulation identifier from a network element on a core network side; and
    wherein the determining the first encapsulation identifier corresponding to the Ethernet session comprises:
        determining, by the apparatus, the third encapsulation identifier as the first encapsulation identifier corresponding to the Ethernet session.

5. The method according to claim 1, wherein the method further comprises:
    sending, by the apparatus, a 5th generation (5G) local area network identifier to a control plane network element, wherein the 5G local area network identifier is an identifier of a 5G local area network to which the Ethernet session belongs.

6. The method according to claim 1, wherein the apparatus is a terminal device.

7. An apparatus, comprising:
- at least one processor; and
- one or more memories coupled to the at least one processor and storing programming instructions for execution by the at least one processor to:
  - after determining that an Ethernet session needs to be established or modified, match an identifier of an application program with a user equipment route selection policy (URSP), wherein the application program is an application program triggering establishment or modification of the Ethernet session, and wherein the URSP comprises a correspondence between an encapsulation identifier and the identifier of the application program;
  - in response to a determination that the identifier of application program exists in the URSP, obtain the encapsulation identifier based on the correspondence;
  - determine the encapsulation identifier as a first encapsulation identifier corresponding to the Ethernet session;
  - encapsulate an uplink data packet based on the first encapsulation identifier and a media access control (MAC) address of the apparatus to generate an encapsulated data packet, wherein the uplink data packet is a data packet triggered by an application program bound to the Ethernet session; and
  - map, based on the first encapsulation identifier, the encapsulated data packet to the Ethernet session for transmission.

8. The apparatus according to claim 7, wherein the map, based on the first encapsulation identifier, the encapsulated data packet to the Ethernet session for transmission comprises:
- map, based on a correspondence between the first encapsulation identifier and the Ethernet session, the encapsulated data packet to the Ethernet session for transmission.

9. The apparatus according to claim 7, wherein the one or more memories store the programming instructions for execution by the at least one processor to:
- before the determine the first encapsulation identifier corresponding to the Ethernet session, allocate a second encapsulation identifier to the Ethernet session in a process of establishing or modifying the Ethernet session; and
- wherein the determine the first encapsulation identifier corresponding to the Ethernet session comprises:
  - determine the second encapsulation identifier as the first encapsulation identifier corresponding to the Ethernet session.

10. The apparatus according to claim 7, wherein the one or more memories store the programming instructions for execution by the at least one processor to:
- before the determine the first encapsulation identifier corresponding to the Ethernet session, and in a process of establishing or modifying the Ethernet session, receive a third encapsulation identifier from a network element on a core network side; and
- wherein the determine the first encapsulation identifier corresponding to the Ethernet session comprises:
  - determine the third encapsulation identifier as the first encapsulation identifier corresponding to the Ethernet session.

11. The apparatus according to claim 7, wherein the one or more memories store the programming instructions for execution by the at least one processor to:
- send a 5th generation (5G) local area network identifier to a control plane network element, wherein the 5G local area network identifier is an identifier of a 5G local area network to which the Ethernet session belongs.

12. The apparatus according to claim 7, wherein the apparatus is a terminal device.

* * * * *